US009252898B2

(12) United States Patent
Hunter et al.

(10) Patent No.: US 9,252,898 B2
(45) Date of Patent: Feb. 2, 2016

(54) MUSIC DISTRIBUTION SYSTEMS

(75) Inventors: Charles Eric Hunter, Hilton Head Island, SC (US); John H. Hebrank, Durham, NC (US)

(73) Assignee: Zarbaña Digital Fund LLC, Wilmington, DE (US)

( * ) Notice: Subject to any disclaimer, the term of this patent is extended or adjusted under 35 U.S.C. 154(b) by 1804 days.

(21) Appl. No.: 12/249,712

(22) Filed: Oct. 10, 2008

(65) Prior Publication Data

US 2009/0099968 A1 Apr. 16, 2009

Related U.S. Application Data

(63) Continuation of application No. 09/493,854, filed on Jan. 28, 2000.

(51) Int. Cl.

| | |
|---|---|
| ***H04L 9/00*** | (2006.01) |
| ***H04H 20/40*** | (2008.01) |
| ***H04H 60/11*** | (2008.01) |
| ***H04H 60/17*** | (2008.01) |
| ***H04H 60/98*** | (2008.01) |
| *H04H 20/16* | (2008.01) |

(52) U.S. Cl.

CPC ............... *H04H 20/40* (2013.01); *H04H 60/11* (2013.01); *H04H 60/17* (2013.01); *H04H 60/98* (2013.01); *H04H 20/16* (2013.01); *H04H 2201/33* (2013.01)

(58) Field of Classification Search

None

See application file for complete search history.

(56) References Cited

U.S. PATENT DOCUMENTS

| | | | |
|---|---|---|---|
| 3,373,517 | A | 3/1968 | Helperin |
| 3,376,465 | A | 4/1968 | Corpew |
| 3,848,193 | A | 11/1974 | Martin et al. |
| 3,941,926 | A | 3/1976 | Slobodzian et al. |
| 3,983,317 | A | 9/1976 | Glorioso |
| 3,993,955 | A | 11/1976 | Belcher et al. |

(Continued)

FOREIGN PATENT DOCUMENTS

| | | |
|---|---|---|
| EP | 0 756 423 A1 | 1/1997 |
| EP | 0 683 943 B1 | 9/1998 |

(Continued)

OTHER PUBLICATIONS

US 5,825,354, 10/1998, Ahmad et al. (withdrawn).

(Continued)

*Primary Examiner* — Mussa A Shaawat

(74) *Attorney, Agent, or Firm* — Christensen O'Connor Johnson Kindness PLLC

(57) ABSTRACT

Music is blanket transmitted to each customer's computer-based user station. Customers preselect from a list of available music in advance using an interactive screen selector, and pay only for music that they choose to have recorded for unlimited playback. An antipiracy "ID tag" is woven into the recorded music so that any illegal copies therefrom may be traced to the purchase transaction. Music is transmitted on a fixed schedule or through an active scheduling process that monitors music requests from all or a subset of satellite receivers and adjust scheduling according to demand for various CD's. In those instances where transmission interruptions result in data loss, the system downloads the next transmission of the requested CD and uses both transmissions to produce a "good copy". In conjunction to the blanket transmission, an automated CD manufacturing facility may be provided to manufacture CD's and distribute them by ground transportation.

25 Claims, 6 Drawing Sheets

(56) References Cited

U.S. PATENT DOCUMENTS 4,071,857 A 1/1978 Whitney et al.
4,094,010 A 6/1978 Pepperl et al.
4,155,042 A 5/1979 Permut et al.
4,230,990 A 10/1980 Lert et al.
4,332,022 A 5/1982 Ceshkovsky et al.
4,368,485 A 1/1983 Midland
4,476,488 A 10/1984 Merrell
4,536,791 A 8/1985 Campbell et al.
4,554,584 A 11/1985 Elam et al.
4,559,480 A 12/1985 Nobs
4,575,750 A 3/1986 Callahan
4,595,950 A 6/1986 Lofberg
4,613,901 A 9/1986 Gilhousen et al.
4,654,482 A 3/1987 DeAngelis
4,716,410 A 12/1987 Nozaki
4,734,779 A 3/1988 Levis et al.
4,734,858 A 3/1988 Schlafly
4,761,641 A 8/1988 Schreiber
4,766,581 A 8/1988 Korn et al.
4,789,863 A 12/1988 Bush
4,794,465 A 12/1988 Van Luyt et al.
4,797,913 A 1/1989 Kaplan et al.
4,809,325 A 2/1989 Hayashi et al.
4,812,843 A 3/1989 Champion, III et al.
4,829,569 A 5/1989 Seth-Smith et al.
4,845,700 A 7/1989 Koizumi et al.
4,847,825 A 7/1989 Levine
4,862,268 A 8/1989 Campbell et al.
4,908,713 A 3/1990 Levine
4,949,187 A 8/1990 Cohen
5,046,090 A 9/1991 Walker et al.
5,051,822 A 9/1991 Rhoades
5,073,925 A 12/1991 Nagata et al.
5,105,418 A 4/1992 Kenmotsu et al.
5,107,107 A 4/1992 Osborne
5,121,430 A 6/1992 Ganzer et al.
5,123,046 A 6/1992 Levine
5,133,079 A 7/1992 Ballantyne et al.
5,182,669 A 1/1993 Chikuma et al.
5,191,573 A 3/1993 Hair
5,214,793 A 5/1993 Conway et al.
5,233,423 A 8/1993 Jernigan et al.
5,235,587 A 8/1993 Bearden et al.
5,251,193 A 10/1993 Nelson et al.
5,257,017 A 10/1993 Jones et al.
5,260,778 A 11/1993 Kauffman et al.
5,274,762 A 12/1993 Peterson et al.
5,283,731 A 2/1994 LaLonde et al.
5,292,568 A 3/1994 Tezuka et al.
5,297,204 A 3/1994 Levine
5,311,423 A 5/1994 Clark
5,319,735 A 6/1994 Preuss et al.
5,355,302 A * 10/1994 Martin et al. ................. 700/234
5,365,282 A 11/1994 Levine
5,373,330 A 12/1994 Levine
5,387,942 A 2/1995 Lemelson
5,393,993 A 2/1995 Edmond et al.
5,410,344 A 4/1995 Graves et al.
5,414,756 A 5/1995 Levine
5,418,713 A * 5/1995 Allen .............................. 705/32
5,420,647 A 5/1995 Levine
5,420,923 A 5/1995 Beyers, II et al.
5,428,606 A 6/1995 Moskowitz
5,438,355 A 8/1995 Palmer
5,440,334 A 8/1995 Walters et al.
5,465,291 A 11/1995 Barrus et al.
5,469,020 A 11/1995 Herrick
5,469,206 A 11/1995 Strubbe et al.
5,473,584 A 12/1995 Oshima
5,483,278 A 1/1996 Strubbe et al.
5,483,535 A 1/1996 McMillen et al.
5,486,819 A 1/1996 Horie
5,495,283 A 2/1996 Cowe
5,497,186 A 3/1996 Kawasaki
5,497,479 A 3/1996 Hornbuckle
5,508,815 A 4/1996 Levine
5,512,935 A 4/1996 Majeti et al.
5,513,260 A 4/1996 Ryan
5,530,751 A 6/1996 Morris
5,532,920 A 7/1996 Hartrick et al.
5,543,856 A 8/1996 Rosser et al.
5,545,454 A 8/1996 Yamada et al.
5,550,863 A 8/1996 Yurt et al.
5,557,541 A * 9/1996 Schulhof et al. ................ 700/94
5,559,549 A 9/1996 Hendricks et al.
5,565,909 A 10/1996 Thibadeau et al.
5,566,315 A 10/1996 Milillo et al.
5,568,272 A 10/1996 Levine
5,572,442 A 11/1996 Schulhof et al.
5,592,511 A * 1/1997 Schoen et al. ................ 375/220
5,592,551 A 1/1997 Lett et al.
5,592,626 A 1/1997 Papadimitriou et al.
5,598,397 A 1/1997 Sim
5,600,839 A 2/1997 MacDonald
5,610,653 A 3/1997 Abecassis
5,612,741 A 3/1997 Loban et al.
5,619,247 A * 4/1997 Russo ........................... 725/104
5,621,840 A 4/1997 Kawamura et al.
5,621,863 A 4/1997 Boulet et al.
5,627,895 A 5/1997 Owaki
5,628,050 A 5/1997 McGraw et al.
5,630,067 A 5/1997 Kindell et al.
5,638,113 A 6/1997 Lappington et al.
5,640,453 A 6/1997 Schuchman et al.
5,644,859 A 7/1997 Hsu
5,646,603 A 7/1997 Nagata et al.
5,646,997 A 7/1997 Barton
5,654,747 A 8/1997 Ottesen et al.
5,659,366 A 8/1997 Kerman
5,659,613 A 8/1997 Copeland et al.
5,661,516 A 8/1997 Carles
5,664,018 A 9/1997 Leighton
5,675,734 A 10/1997 Hair
5,682,206 A 10/1997 Wehmeyer et al.
5,684,918 A 11/1997 Abecassis
5,686,954 A 11/1997 Yoshinobu et al.
5,689,799 A 11/1997 Dougherty et al.
5,692,214 A 11/1997 Levine
5,694,551 A 12/1997 Doyle et al.
5,701,161 A 12/1997 Williams et al.
5,701,383 A 12/1997 Russo et al.
5,701,397 A 12/1997 Steimle et al.
5,710,869 A 1/1998 Godefray et al.
5,717,814 A 2/1998 Abecassis
5,717,832 A 2/1998 Steimle et al.
5,721,827 A * 2/1998 Logan et al. .................. 709/217
5,721,951 A 2/1998 DorEl
5,724,062 A 3/1998 Hunter
5,724,091 A 3/1998 Freeman et al.
5,724,525 A 3/1998 Beyers, II et al.
5,729,214 A 3/1998 Moore
5,734,413 A 3/1998 Lappington et al.
5,734,720 A 3/1998 Salganicoff
5,734,781 A 3/1998 Cantone
5,740,326 A 4/1998 Boulet et al.
5,745,569 A 4/1998 Moskowitz et al.
5,748,716 A 5/1998 Levine
5,758,257 A 5/1998 Herz et al.
5,760,820 A 6/1998 Eda et al.
5,761,606 A 6/1998 Wolzien
5,761,721 A 6/1998 Baldus et al.
5,771,334 A 6/1998 Yamauchi et al.
5,781,734 A 7/1998 Ohno et al.
5,790,202 A 8/1998 Kummer et al.
5,790,935 A 8/1998 Payton
5,790,937 A 8/1998 Gutle
5,799,285 A 8/1998 Klingman
5,805,154 A 9/1998 Brown
5,805,763 A 9/1998 Lawler et al.
5,809,139 A 9/1998 Girod et al.
5,815,484 A 9/1998 Smith et al.
5,815,662 A 9/1998 Ong
5,818,806 A 10/1998 Wong et al.
5,822,291 A 10/1998 Brindze et al.

(56) References Cited

U.S. PATENT DOCUMENTS 5,822,432 A 10/1998 Moskowitz et al.
5,825,407 A 10/1998 Cowe et al.
5,826,123 A 10/1998 Lai
5,828,402 A 10/1998 Collings
RE35,954 E 11/1998 Levine
5,832,287 A 11/1998 Atalla
5,835,896 A 11/1998 Fisher et al.
5,841,979 A 11/1998 Schulhof et al.
5,845,083 A 12/1998 Hamadani et al.
5,848,129 A 12/1998 Baker
5,848,155 A 12/1998 Cox
5,848,352 A 12/1998 Dougherty et al.
5,854,779 A 12/1998 Johnson et al.
5,857,020 A 1/1999 Peterson, Jr.
5,860,068 A 1/1999 Cook
5,862,260 A 1/1999 Rhoads
5,870,717 A 2/1999 Wiecha
5,874,985 A 2/1999 Matthews, III
5,878,017 A 3/1999 Ikegame
5,884,284 A 3/1999 Peters et al.
5,889,868 A 3/1999 Moskowitz et al.
5,890,136 A 3/1999 Kipp
5,897,622 A 4/1999 Blinn et al.
5,898,384 A 4/1999 Alt et al.
5,899,980 A 5/1999 Wilf et al.
5,903,262 A 5/1999 Ichihashi et al.
5,903,878 A 5/1999 Talati
5,905,713 A 5/1999 Anderson et al.
5,905,800 A 5/1999 Moskowitz et al.
5,909,492 A 6/1999 Payne et al.
5,914,712 A 6/1999 Sartain et al.
5,914,774 A 6/1999 Ota
5,915,018 A 6/1999 Aucsmith
5,915,027 A 6/1999 Cox et al.
5,915,068 A 6/1999 Levine
5,918,213 A 6/1999 Bernard et al.
5,926,230 A 7/1999 Niijima et al.
5,930,369 A 7/1999 Cox et al.
5,931,901 A 8/1999 Wolfe et al.
5,933,499 A 8/1999 Enari
5,933,798 A 8/1999 Linnartz
5,934,795 A 8/1999 Rykowski et al.
5,940,135 A 8/1999 Petrovic et al.
5,940,807 A 8/1999 Purcell
5,943,670 A 8/1999 Prager
5,946,665 A 8/1999 Suzuki et al.
5,949,885 A 9/1999 Leighton
5,956,716 A 9/1999 Kenner et al.
5,959,885 A 9/1999 Rao
5,959,945 A 9/1999 Kleiman et al.
5,960,081 A 9/1999 Vynne et al.
5,960,411 A 9/1999 Hartman et al.
5,963,217 A 10/1999 Grayson et al.
5,963,264 A 10/1999 Jackson
5,963,915 A 10/1999 Kirsch
5,963,917 A 10/1999 Ogram
5,966,440 A 10/1999 Hair
5,966,697 A 10/1999 Fergerson et al.
5,969,283 A 10/1999 Looney et al.
5,969,715 A 10/1999 Dougherty et al.
5,970,471 A 10/1999 Hill
5,970,472 A 10/1999 Allsop et al.
5,970,473 A 10/1999 Gerszberg et al.
5,970,474 A 10/1999 Leroy et al.
5,970,475 A 10/1999 Barnes et al.
5,974,396 A 10/1999 Anderson et al.
5,978,775 A 11/1999 Chen
5,983,199 A 11/1999 Kaneko
5,983,200 A 11/1999 Slotznick
5,983,201 A 11/1999 Fay
5,988,078 A 11/1999 Levine
5,991,399 A 11/1999 Graunke et al.
5,992,888 A 11/1999 North et al.
6,002,772 A 12/1999 Saito
6,005,938 A 12/1999 Banker et al.
6,006,332 A 12/1999 Rabne et al.
6,011,722 A 1/2000 Bude et al.
6,012,086 A 1/2000 Lowell
6,013,007 A 1/2000 Root et al.
6,014,491 A 1/2000 Hair
6,023,451 A 2/2000 Kashiwagi et al.
6,025,868 A 2/2000 Russo
6,029,045 A 2/2000 Picco et al.
6,029,141 A 2/2000 Bezos et al.
6,032,130 A 2/2000 Alloul et al.
6,041,316 A 3/2000 Allen
6,044,047 A 3/2000 Kulas
6,052,554 A 4/2000 Hendricks et al.
6,061,440 A 5/2000 Delaney et al.
6,064,980 A 5/2000 Jacobi et al.
6,067,107 A 5/2000 Travaille et al.
6,067,532 A 5/2000 Gebb
6,069,868 A 5/2000 Kashiwagi
6,072,982 A 6/2000 Haddad
6,073,372 A 6/2000 Davis
6,081,785 A 6/2000 Oshima et al.
6,088,455 A 7/2000 Logan et al.
6,088,722 A 7/2000 Herz et al.
6,091,883 A 7/2000 Artigalas et al.
6,112,192 A 8/2000 Capek
6,115,348 A 9/2000 Guerra
6,118,976 A 9/2000 Arias et al.
6,119,096 A 9/2000 Mann et al.
6,122,403 A 9/2000 Rhoads
6,131,130 A 10/2000 Van Ryzin
6,141,530 A 10/2000 Rabowsky
6,147,715 A 11/2000 Yuen et al.
6,148,033 A 11/2000 Pearlstein et al.
6,148,142 A 11/2000 Anderson
6,148,428 A 11/2000 Welch et al.
6,150,964 A 11/2000 McLaughlin
6,151,600 A 11/2000 Dedrick
6,175,840 B1 1/2001 Chen et al.
6,177,931 B1 1/2001 Alexander et al.
6,198,875 B1 3/2001 Edenson et al.
6,201,777 B1 3/2001 Tsuchiya et al.
6,209,787 B1 4/2001 Iida
6,226,618 B1 5/2001 Downs et al.
6,228,440 B1 5/2001 Dailey et al.
6,229,453 B1 5/2001 Gardner et al.
6,233,389 B1 5/2001 Barton et al.
6,233,682 B1 5/2001 Fritsch
6,236,760 B1 5/2001 Bagni
6,238,763 B1 5/2001 Sandstrom
6,240,401 B1 5/2001 Oren et al.
6,243,350 B1 6/2001 Knight et al.
6,247,047 B1 6/2001 Wolff
6,247,130 B1 6/2001 Fritsch
6,249,532 B1 6/2001 Yoshikawa et al.
6,265,424 B1 7/2001 Tisdell et al.
6,269,394 B1 7/2001 Kenner et al.
6,272,636 B1 8/2001 Neville et al.
6,288,753 B1 9/2001 DeNicola et al.
6,297,859 B1 10/2001 George
6,317,164 B1 11/2001 Hrusecky et al.
6,343,738 B1 2/2002 Ogilvie
6,363,356 B1 3/2002 Horstmann
6,385,596 B1 5/2002 Wiser et al.
6,400,996 B1 6/2002 Hoffberg et al.
6,405,203 B1 6/2002 Collart
6,408,313 B1 6/2002 Campbell et al.
6,424,998 B2 7/2002 Hunter
6,430,603 B2 8/2002 Hunter
6,430,605 B2 8/2002 Hunter
6,438,579 B1 8/2002 Hosken
6,453,420 B1 9/2002 Collart
6,456,331 B2 9/2002 Kwoh
6,463,467 B1 10/2002 Mages et al.
6,493,874 B2 12/2002 Humpleman
6,496,822 B2 12/2002 Rosenfelt et al.
6,504,798 B1 1/2003 Revis
6,510,177 B1 1/2003 De Bonet et al.
6,519,341 B1 2/2003 Enari
6,519,571 B1 2/2003 Guheen et al.

(56) References Cited

U.S. PATENT DOCUMENTS

| | | | |
|---|---|---|---|
| 6,522,769 | B1 | 2/2003 | Rhoads et al. |
| 6,529,526 | B1 | 3/2003 | Schneidewend |
| 6,549,719 | B2 | 4/2003 | Mankovitz |
| 6,574,424 | B1 | 6/2003 | Dimitri et al. |
| 6,604,240 | B2 | 8/2003 | Ellis et al. |
| 6,606,744 | B1 | 8/2003 | Mikurak |
| 6,611,820 | B2 | 8/2003 | Oshima et al. |
| 6,621,933 | B2 | 9/2003 | Chung et al. |
| 6,625,333 | B1 | 9/2003 | Wang et al. |
| 6,637,029 | B1 | 10/2003 | Maissel et al. |
| 6,641,886 | B1 | 11/2003 | Bakos et al. |
| 6,647,417 | B1 | 11/2003 | Hunter et al. |
| 6,662,231 | B1 | 12/2003 | Drosset et al. |
| 6,681,326 | B2 | 1/2004 | Son et al. |
| 6,697,948 | B1 | 2/2004 | Rabin et al. |
| 6,708,157 | B2 | 3/2004 | Stefik et al. |
| 6,718,551 | B1 | 4/2004 | Swix et al. |
| 6,728,271 | B1 | 4/2004 | Kawamura et al. |
| 6,728,713 | B1 | 4/2004 | Beach et al. |
| 6,732,366 | B1 | 5/2004 | Russo |
| 6,735,251 | B2 | 5/2004 | Sugahara |
| 6,756,997 | B1 | 6/2004 | Ward et al. |
| 6,760,442 | B1 | 7/2004 | Scott |
| 6,769,020 | B2 | 7/2004 | Miyazaki et al. |
| 6,772,331 | B1 | 8/2004 | Hind et al. |
| 6,778,678 | B1 | 8/2004 | Podilchuk et al. |
| 6,783,886 | B1 | 8/2004 | Sakakibara et al. |
| 6,792,007 | B1 | 9/2004 | Hamada et al. |
| 6,799,326 | B2 | 9/2004 | Boylan et al. |
| 6,810,131 | B2 | 10/2004 | Nakagawa et al. |
| 6,829,301 | B1 | 12/2004 | Tinker et al. |
| 6,829,368 | B2 | 12/2004 | Meyer et al. |
| 6,842,522 | B1 | 1/2005 | Downing |
| 6,850,901 | B1 | 2/2005 | Hunter et al. |
| 6,881,465 | B2 | 4/2005 | Ogawa et al. |
| 6,882,979 | B1 | 4/2005 | Reay et al. |
| 6,889,383 | B1 | 5/2005 | Jarman |
| 6,928,423 | B1 | 8/2005 | Yamanaka |
| 6,931,534 | B1 | 8/2005 | Jandel et al. |
| 6,931,657 | B1 | 8/2005 | Marsh |
| 6,944,600 | B2 | 9/2005 | Stefik et al. |
| 6,948,070 | B1 | 9/2005 | Ginter et al. |
| 6,952,685 | B1 | 10/2005 | Hunter et al. |
| 6,956,833 | B1 | 10/2005 | Yukie et al. |
| 6,959,220 | B1 | 10/2005 | Wiser et al. |
| 6,990,678 | B2 | 1/2006 | Zigmond |
| 6,999,946 | B2 | 2/2006 | Nuttall |
| 7,006,974 | B2 | 2/2006 | Burchard et al. |
| 7,032,237 | B2 | 4/2006 | Tsunoda et al. |
| 7,039,684 | B2 | 5/2006 | Blockton et al. |
| 7,047,302 | B1 | 5/2006 | Chatani et al. |
| 7,120,800 | B2 | 10/2006 | Ginter et al. |
| 7,130,892 | B2 | 10/2006 | Mukai |
| 7,155,733 | B2 | 12/2006 | Rodriguez et al. |
| 7,169,334 | B2 | 1/2007 | Yamamoto et al. |
| 7,191,153 | B1 | 3/2007 | Braitberg et al. |
| 7,197,758 | B1 | 3/2007 | Blackketter et al. |
| 7,209,900 | B2 | 4/2007 | Hunter et al. |
| 7,233,781 | B2 | 6/2007 | Hunter et al. |
| 7,251,330 | B2 | 7/2007 | Terao et al. |
| 7,263,188 | B2 | 8/2007 | Kohno |
| 7,263,497 | B1 | 8/2007 | Wiser et al. |
| 7,269,634 | B2 | 9/2007 | Getsin et al. |
| 7,313,802 | B1 | 12/2007 | Tomsen |
| 7,359,881 | B2 | 4/2008 | Stefik et al. |
| 7,370,016 | B1 | 5/2008 | Hunter et al. |
| 7,383,564 | B2 | 6/2008 | White et al. |
| 7,428,639 | B2 | 9/2008 | Demos |
| 7,440,674 | B2 | 10/2008 | Plotnick et al. |
| 7,487,128 | B2 | 2/2009 | Spagna et al. |
| 7,499,564 | B2 | 3/2009 | Rhoads |
| 7,539,110 | B2 | 5/2009 | Mizuno et al. |
| 2001/0003846 | A1 | 6/2001 | Rowe et al. |
| 2001/0013037 | A1 | 8/2001 | Matsumoto |
| 2001/0013120 | A1 | 8/2001 | Tsukamoto |
| 2001/0016836 | A1 | 8/2001 | Boccon-Gibod et al. |
| 2001/0018742 | A1 | 8/2001 | Hirai |
| 2001/0018858 | A1 | 9/2001 | Dwek |
| 2001/0023416 | A1 | 9/2001 | Hosokawa |
| 2001/0025259 | A1 | 9/2001 | Rouchon |
| 2001/0025269 | A1 | 9/2001 | Otsuka |
| 2001/0025316 | A1 | 9/2001 | Oh |
| 2001/0027563 | A1 | 10/2001 | White et al. |
| 2001/0029491 | A1 | 10/2001 | Yoneta et al. |
| 2001/0029583 | A1 | 10/2001 | Palatov et al. |
| 2001/0030660 | A1 | 10/2001 | Zainoulline |
| 2001/0032131 | A1 | 10/2001 | Mowry |
| 2001/0032132 | A1 | 10/2001 | Moran |
| 2001/0032133 | A1 | 10/2001 | Moran |
| 2001/0032312 | A1 | 10/2001 | Runje et al. |
| 2001/0034635 | A1 | 10/2001 | Winters |
| 2001/0037465 | A1 | 11/2001 | Hart et al. |
| 2001/0042043 | A1 | 11/2001 | Shear et al. |
| 2001/0047298 | A1 | 11/2001 | Moore et al. |
| 2002/0028024 | A1 | 3/2002 | Jayant et al. |
| 2002/0056112 | A1 | 5/2002 | Dureau et al. |
| 2002/0056118 | A1 | 5/2002 | Hunter et al. |
| 2002/0057799 | A1 | 5/2002 | Kohno |
| 2002/0066025 | A1 | 5/2002 | Sato et al. |
| 2002/0095357 | A1 | 7/2002 | Hunter et al. |
| 2002/0100043 | A1 | 7/2002 | Lowthert et al. |
| 2002/0103699 | A1 | 8/2002 | Figueiras Ferreiro |
| 2002/0112235 | A1 | 8/2002 | Ballou et al. |
| 2002/0112243 | A1 | 8/2002 | Hunter et al. |
| 2002/0120925 | A1 | 8/2002 | Logan |
| 2002/0124251 | A1 | 9/2002 | Hunter et al. |
| 2003/0004796 | A1 | 1/2003 | Struble |
| 2003/0028888 | A1 | 2/2003 | Hunter et al. |
| 2003/0036974 | A1 | 2/2003 | Allen |
| 2003/0061607 | A1 | 3/2003 | Hunter et al. |
| 2003/0067554 | A1 | 4/2003 | Klarfeld et al. |
| 2003/0133692 | A1 | 7/2003 | Hunter |
| 2003/0149989 | A1 | 8/2003 | Hunter et al. |
| 2004/0083492 | A1 | 4/2004 | Goode et al. |
| 2004/0103439 | A1 | 5/2004 | Macrae et al. |
| 2005/0010949 | A1 | 1/2005 | Ward et al. |
| 2005/0182730 | A1 | 8/2005 | Hunter et al. |
| 2006/0195548 | A1 | 8/2006 | Hunter et al. |
| 2006/0212892 | A1 | 9/2006 | Hunter et al. |
| 2006/0212908 | A1 | 9/2006 | Hunter et al. |
| 2006/0225332 | A1 | 10/2006 | Zenisek |
| 2006/0229904 | A1 | 10/2006 | Hunter et al. |
| 2006/0294016 | A1 | 12/2006 | Hunter et al. |
| 2007/0028276 | A1 | 2/2007 | Inoue et al. |
| 2007/0110240 | A1 | 5/2007 | Moskowitz et al. |
| 2007/0186272 | A1 | 8/2007 | Hunter et al. |
| 2007/0234391 | A1 | 10/2007 | Hunter et al. |
| 2007/0276740 | A1 | 11/2007 | Hunter et al. |

FOREIGN PATENT DOCUMENTS

| | | | |
|---|---|---|---|
| EP | 0 942 417 | A2 | 3/1999 |
| EP | 0 954 176 | A2 | 11/1999 |
| EP | 0 954 179 | A2 | 11/1999 |
| EP | 0 975 111 | A2 | 1/2000 |
| EP | 0 977 389 | A2 | 2/2000 |
| EP | 0 984 631 | A1 | 3/2000 |
| EP | 0 994 470 | A2 | 4/2000 |
| EP | 1 252 732 | B1 | 1/2001 |
| EP | 1 104 195 | A2 | 5/2001 |
| EP | 1 143 721 | A1 | 10/2001 |
| EP | 1 226 715 | B1 | 4/2008 |
| JP | 360253082 | A | 12/1985 |
| JP | 407143081 | A | 6/1995 |
| JP | 410290441 | A | 10/1998 |
| JP | 11 150517 | A | 6/1999 |
| JP | 11 163811 | A | 6/1999 |
| JP | 11 231077 | A | 8/1999 |
| JP | 11 259764 | A | 9/1999 |
| JP | 11 331150 | A | 11/1999 |
| JP | 11 331839 | A | 11/1999 |
| JP | 2002015333 | | 1/2002 |
| JP | 2002099283 | | 4/2002 |
| JP | 2002156979 | | 5/2002 |

(56) References Cited

FOREIGN PATENT DOCUMENTS

| | | |
|---|---|---|
| TW | 503657 | 9/2002 |
| TW | 527835 | 4/2003 |
| TW | 1279100 | 4/2007 |
| WO | WO 91/03112 | 3/1991 |
| WO | WO 92/22983 | 12/1992 |
| WO | WO 94/13107 | 6/1994 |
| WO | WO 96/26605 | 8/1996 |
| WO | WO 96/34467 | 10/1996 |
| WO | WO 96/34494 | 10/1996 |
| WO | WO 98/26357 | 6/1998 |
| WO | WO 98/27732 | 6/1998 |
| WO | WO 99/18518 | 4/1999 |
| WO | WO 99/18727 | 4/1999 |
| WO | WO 99/31842 | 6/1999 |
| WO | WO 00/05886 | 2/2000 |
| WO | WO 00/07368 | 2/2000 |
| WO | WO 00/14965 | 3/2000 |
| WO | WO 01/01677 | 1/2001 |
| WO | WO 01/17242 | 3/2001 |
| WO | WO 01/41013 | 6/2001 |
| WO | WO 01/47249 | 6/2001 |
| WO | WO 01/54324 | 7/2001 |
| WO | WO 01/54410 | 7/2001 |
| WO | WO 01/74050 | 10/2001 |
| WO | WO 01/82625 | 11/2001 |
| WO | WO 02/65750 | 8/2002 |

OTHER PUBLICATIONS

"About us," http://www.egghead.com/ShowPage.dll?page=hd_aboutus_aboutus_p, printed Sep. 29, 2001.
"Ashton Digital VisionGate 52 15.1' TFT-LCD, Pivot Screen, USB Hub, w/ Speakers," wysiwyg://253/http://auctions.egghead.com... LotNo=66044439, printed Sep. 26, 2001.
"Bid Receipt for Bid No. 5270411," wysiwyg:/220/http://auctions.egghead.com...KioskListing=0, printed Sep. 29, 2001.
"Calimetrics' Multilevel Technology Enables Higher-Performance CD/DVD Recorders: An IDC White Paper," Wolfgang Schlichting, (Copyright 2000).
"Confirm Your Bid." wysiwyg:/220/http://auctions.egghead.com... ShipCountrv=US, printed Sep. 29, 2001.
"DataPlay, Inc.—Universal Recording Medai—Discover," http://www/dataplay.com/jsp_files/en/discover/index-music.jsp, downloaded and printed on May 14, 2002, (Copyright 2001).
"DataPlay, Inc.—Universal Recording Media—Industry," http://www.dataplay.com/jsp_files/en/industry.contentproviders.jsp, downloaded and printed on May 14, 2002. (Copyright 2001).
"DataPlay, Inc.—Universal Recording Media—Industry," http://www.dataplay.com/jsp_files/en/industry/index.jsp, downloaded and printed on May 14, 2002. (Copyright 2001).
"DataPlay, Inc.—Universal Recording Media—Industry" http://www.dataplay.com/jsp_files/en/industry/products-contentkey.jsp, downloaded and printed on May 14, 2002. (Copyright 2001).
"DataPlay, Inc.—Universal Recording Media—Industry," http://www.dataplay.com/jsp_files/en/industry/products-digitalmedia.jsp, downloaded and printed on May 14, 2002. (Copyright 2001).
"DataPlay, Inc.—Universal Recording Media—Industry," http://www.dataplay.com/jsp_files/en/industry/products-engines.jsp, downloaded and printed on May 14, 2002. (Copyright 2001).
"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).
"DataPlay, Inc.—Universal Recording Media—What's Playing on DataPlay," http://www/dataplay.com/servlets/ProductList?action=productSearch, downloaded and printed on May 14, 2002, (Copyright 2001).
"Demographics profile," http://www.egghead.com/ShowPage.dll?page=_aboutus_demo_p, printed Sep. 29, 2001.
"What's Playing on DataPlay—Everything Digital," DataPlay Digital Media Product Brochure, downloaded and printed on May 14, 2002, (Copyright 2000-2001).
"What's Playing on DataPlay—Everything Digital," DataPlay Micro-optical Engine Product Brochure, downloaded and printed on May 14, 2002, (Copyright 2000-2002).
"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.
"Wink Broadcast Server," http://www.wink.com/contents/tech_wbs.shtml, downloaded and printed on May 14, 2002.
"Wink Client Software," http://www.wink.com/contents/tech_engine.shtml, downloaded and printed on May 14, 2002.
"Wink Communications, Inc., Changes the Advertising Landscape," http://www.wink.com/contents/PressReleases/930709807/content.shtml, downloaded and printed on May 14, 2002, dated Jan. 21, 1999.
"Wink Response Server and Wink Response Network," http://www.wink.com/contents/tech_wrs.shtml, downloaded and printed on May 14, 2002.
"Wink Studio and Wink Server Studio," http://www.wink.com/contents/tech_studio.shtml, downloaded and printed on May 14, 2002.
"Wink's History," http://www.wink.com/contents/history.shtml, downloaded and printed on May 14, 2002.
"Wink Television Press Room," http://www.wink.com/contents/PressReleases.shtml, downloaded and printed on May 14, 2002.
DVD-Video Format Book Specification, Version 1.11, published Mar. 1999 by Toshiba Corporation on behalf of DVD forum.
Egghead Packing Receipt (Franklin Rex Organizer), received Dec. 1999.
IBM Technical Disclosure Bulletin, "Multimedia Audio on Demand," 1994, 37, 1 page (Abstract only).
Connell, N., "Conference on Lasers and Electro-Optics: Perspectives on Printing, Storage and Display," 1996 Tech Digest Series, vol. 9.
Tsuchiya et al., "High Density Digital Videodics Using 635 nm Laser Diode," IEEE, Aug. 1994, 6 pages.
Sennaroglu et al., "Generation of Tunable Femtosecond Pulses in the 1.21-1.27 um and 605-635 nm Wavelength Region by Using a regenertively Initiated Self-Mode-Locked Cr: Forsterite Laser," IEEE, Aug. 1994, 11 pages.
Onsale Packing Sheet (Jason Deep Space Series 225 X 60 Astronomy Telescope), received Jul. 1999.
U.S. Appl. No. 09/385,671, Charles Eric Hunter, filed Aug. 27, 1999.
U.S. Appl. No. 09/476,078, Charles Eric Hunter, filed Dec. 30, 1999.
"Enter Your Bid," https://auctions.egqhead.com/scripts/... LotNo=66044439, printed Sep. 29, 2001.
"Enter Your Bid." wysiwyg://218/http://auctions.egghead.com... 5a99, printed Sep. 29, 2001.
"How Wink Works," http://www.wink.com/contents/howitworks.shtml, downloaded and printed on May 14, 2002.
"ICAP and HTML (ATVEF)," http://www.wink.com/contents/tech_icap.shtml. downloaded and printed on May 14, 2002.
"Internet Archive Way Back Machine—Searched for http://www.egghead.com," printed Apr. 8, 2002. (Copyright 2001).
"Internet Archive Way Back Machine—Searched for http://www.onsale.com," printed Apr. 8, 2002, (Copyright 2001).
"Login/Logout," http://www.egghead.com/ShowPage.dll?page... 44439, printed Sep. 29, 2001.
"Making Digital Cinema Actually Happen—What it Takes and Who's Going to Do It," Steven A Morley, (Copyright 1998).
"New Credit Information," https://secure.fairmarket.com/secure/Cre...FM1001, printed Sep. 26, 2001.
"Onsale Invoice," http://www.onsale.com/cgi-win/invoice.exe, dated Jan. 19, 1998, printed Jan. 20, 1998, (Copyright 1997).
"Privacy and Security Policy," http://www.egghead.com/ShowPage.dll?page=hd_policy_policyandprivacy_p, printed Sep. 29, 2001.
"Quadrant 256MB, PC133 (PC-100 Compatible), 32X64, 7ns, 168-Pin, SdRAM DIMM Module (New)," wysiwyg://253/http://auctions.egghead.com...LotNo=65659811&BatchNo=0, printed Sep. 24, 2001.

(56) References Cited

OTHER PUBLICATIONS

"Registration," http://www.egghead.com/ShowPage.dll?page=reg_pagel_ceos&S=l, printed Sep. 26, 2001.
"Sell Goods to Egghead.com." http://www.egghead.com/ShowPage.dll?page=hd_aboutus_sellgoods_p, printed Sep. 29, 2001.
"Streaming Onto the Movie Screen, with Nary a Scratch," Karen J. Bannan, The New York Times, May 9, 2002, p. E5.
"The Wink System." http://www.wink.com/contents/tech_diagram.shtml, downloaded and printed on May 14, 2002.
"Universal Product Code (UPC) and EAN Article Numbering Code (EAN) Page," http://www.adamsl.com/pub/russadam/upccode.html, by Russ Adams, printed Sep. 24, 2001.
"What is Wink: Examples," http://www.wink.com/contents/examples.shtml, downloaded and printed on May 14, 2002.
U.S. Appl. No. 09/493,854, Charles Eric Hunter et al., filed Jan. 28, 2000.
U.S. Appl. No. 09/553,524, Charles Eric Hunter et al., filed Apr. 20, 2000.
U.S. Appl. No. 09/645,087, Charles Eric Hunter et al., filed Aug. 24, 2000.
U.S. Appl. No. 09/675,025, Charles Eric Hunter et al., filed Sep. 28, 2000.
U.S. Appl. No. 09/707,273, Charles Eric Hunter et al., filed Nov. 6, 2000.
U.S. Appl. No. 11/801,109, Charles Eric Hunter et al., filed May 7, 2007.
U.S. Appl. No. 60/169,274, pp. 1-45, filed Dec. 7, 1999, 109 pages.
Williams, "MP3 All in One", Newsbytes, Jul. 23, 1999, 1 page.
U.S. Appl. No. 11/468,959, filed Aug. 31, 2006, Hunter, et al.
U.S. Appl. No. 11/468,963, filed Aug. 31, 2006, Hunter, et al.
U.S. Appl. No. 11/468,969, filed Aug. 31, 2006, Hunter, et al.
U.S. Appl. No. 11/469,130, filed Aug. 31, 2006, Hunter, et al.
U.S. Appl. No. 11/469,292, filed Aug. 31, 2006, Hunter, et al.
U.S. Appl. No. 11/469,319, filed Aug. 31, 2006, Hunter, et al.
ISO/IEC 13818-1, First edition. "Information technology—Generic coding of moving pictures and associated audio information: Systems." International Organization for Standardization (ISO) and International Electrotechnical Commission (IEC). Apr. 15, 1996. p. 1-6.
PCT International Preliminary Examination Report received Aug. 3, 2001, in corresponding International Application No. PCT/US00/23410.
PCT International Preliminary Examination Report received Feb. 4, 2002, in corresponding International Application No. PCT/US01/01979.
United States Patent and Trademark Office: Final Office Action dated Jan. 22, 2008, U.S. Appl. No. 09/493,85.
United States Patent and Trademark Office: Final Office Action dated Oct. 16, 2002, U.S. Appl. No. 09/493,854.
United States Patent and Trademark Office: Non-Final Office Action dated Mar. 29, 2002, U.S. Appl. No. 09/493,854.
United States Patent and Trademark Office: Restriction Requirement dated Jan. 15, 2002, U.S. Appl. No. 09/493,854.
Communication: Supplementary EP Search Report dated Apr. 19, 2005, in corresponding EP application No. 009594300.
"Circuit City's DIVX Format Bites the Dust!" published Jun. 21, 1999; source: www.hometheater.about.com.
PCT International Search Report mailed Nov. 28, 2000, in corresponding International Application No. PCT/US00/23410.
PCT International Search Report mailed May 17, 2001, in corresponding International Application No. PCT/US01/01979.
PCT International Search Report mailed Aug. 28, 2001, in corresponding International Application No. PCT/US01/05675.
Communication by the Examining Division dated Mar. 22, 2004, in corresponding EP application No. 019031848.
Communication by the Examining Division dated Jul. 29, 2005, in corresponding EP application No. 009594300.
PCT International Preliminary Examination Report received Jun. 3, 2002, in corresponding International Application No. PCT/US01/05675.

* cited by examiner

| Step | Mode Name | Description | Hardware Involved |
|---|---|---|---|
| 1 | Selection | Customer looks at recently updated "catalog" of available music selections on his TV using the graphical user interface. Use remote to page through information. | User station, remote, customer TV, stored catalog |
| 2 | Ordering | Customer uses user station, remote and TV screen to order standard or customized CD. Order communicated to central controller by Internet or modem. Central controller issues decoding and encryption key(s), selection locations and order number to user station for preview. | User station, modem/ Internet, remote, customer TV |
| 3 | Downloading | Music selections are downloaded during early morning transmission hours as encrypted, compressed files through customer's satellite dish and receiver to hard disk in user station. User station selects correct TV channel on receiver using IR link. | User station, satellite receiver, video output interface |
| 4 | Decoding | User station uses decoding key(s) to decode downloaded file(s) so that full quality music is on disk drive (or other storage medium) in user station. Customer order number is hidden within this music based upon encryption information received during ordering process. | User station |
| 5 | Previewing | Brief portions of downloaded selections may be "previewed" by the customer along with the entire selection that has been "hobbled" by removing information to degrade music quality and prevent reconstruction of music. | User station, remote, customer's amp, speakers and TV |
| 6 | Playing | Customer plays full-quality selection through his hi-fi or TV sound system with post billing back his account via later modem/Internet communication with the central controller. Playing may include graphics, written jacket information, or hearing impaired cues shown on customer's TV. | User station, remote, customer's amp, speakers and TV |
| 7 | CD Delivery | Full-quality CD that can be heard on any CD player is burned with order number (ID tag) hidden in the music. (Burning process does not need to be quick.) | User station, CD burner, customer supplied CD |
| | Account Setup | Happens when customer buys and hooks up the user station. | |

FIG. 2

MUSIC DISTRIBUTION SYSTEMS

CROSS REFERENCE TO RELATED APPLICATIONS

This application is a continuation of U.S. patent application Ser. No. 09/493,854 filed Jan. 28, 2000, the entire contents of which are hereby incorporated by reference in its entirety.

TECHNICAL FIELD

The invention relates to music distribution. In certain embodiments, music is blanket transmitted (for example, via satellite downlink transmission) to each customer's computer-based user station. Customers preselect from a list of available music in advance using an interactive screen selector, and pay only for music that they choose to record for unlimited playback. An antipiracy "ID tag" is woven into the recorded music so that any illegal copies therefrom may be traced to the purchase transaction.

BACKGROUND

Current music distribution systems have numerous drawbacks that affect pricing, consumer satisfaction and the ability of music content providers to maximize the revenue potential of their music libraries. One distribution model, the conventional retail music store, requires high capital outlays for real estate (land and building) and high labor costs, both of which add greatly to the retail price of music recordings. Additionally, costs associated with ordering the recordings (e.g., CD's), transporting the recordings to the store locations and maintaining inventory significantly add to the retail price of recordings for both retail store operations and mail order or "music club" operations. In addition to the drawbacks mentioned above, music content providers would greatly benefit from a distribution system that makes all of their content, including older recordings, readily available at market clearing pricing.

The recent Internet music distribution model, typically based on MP3 technology, requires a customer go to an Internet site, select or be given a music selection, download reception software and a key, preview or purchase a selection, download a one-to-one encrypted (or not) compressed copy of the selection, decrypt the selection with software and play the selection on the consumer's computer or write it to a CD, DVD, MD or digital player. The download is stored in some form on the customer's hard drive There is an acute need in the music distribution industry for a system that will overcome problems inherent in current distribution models by providing each individual customer with ready access to thousands of recordings in a convenient low cost manner that fully satisfies user demand, while enhancing the economic incentives of music content providers to create and distribute an ever expanding offering of music.

Throughout the world today, piracy of software, music and video materials causes significant economic losses to the originators and distributors of these art forms.

Issues of music and video piracy are strongly influenced by the available recording technology. Early forms of music distribution utilized plastic records. The manufacture of records was relatively expensive, requiring the capital expense of record presses and creating metallic master molds. Mold costs had to be amortized over large numbers of copies. The cost of mold masters limited the potential profit from making and selling illegal copies.

With the development of magnetic tape recording, the cost of manufacturing copies became primarily the cost of the raw materials. Copies could be made directly from an original with costs split between the manufacture of a blank tape and the time required to record music on to each tape copy. The manufacture of lower numbers of copies for specialty music was possible and the costs of manufacturing (a pair of tape recorders and some blank tapes) made copying feasible for an individual. However, the degradation in quality from generation to generation of copies was a deterrent as well as the time required to record each copy. The degradation of the sound consisted of loss of high frequencies, a relatively poor signal-to-noise ratio of the recording ("hiss") and tonal or volume variations due to mechanical transport of the tape across the recording head ("wow" and "flutter").

Digital compact disk technology (CD's) again changed the piracy situation by making available high-quality copies of music to consumers in digital form that could potentially be copied with no change or degradation of sound quality. CD's use 16-bit, 44 KHz digital technology so that music recorded on a CD has excellent signal-to-noise ratio, flat frequency response that is wider than human hearing, and no constant or varying pitch distortion. The introduction of CD technology caused significant concern among content providers about the risks of circulating library-quality copies of their music. Small-scale piracy of CD's became common as consumer music "boxes" were sold that had CD players feeding tape recorders. These units allowed CD's to be easily copied although without the full sound quality and convenience of the original CD. On a larger scale, bulk pirate copies of CD's were available, particularly in foreign countries, by companies using relatively expensive CD presses. The presses allowed exact copies of CD's to be made from originals using inexpensive blanks. These same presses also allowed low-cost copying and duplication of software CD's.

Very recently, concerns about music piracy have increased as low-cost CD writers became available to consumers making it possible for personal computers not only to read and play music CD's, but also to make copies using relatively inexpensive writeable CD's. Today CD writers are available for under $200 and CD blanks for less than $1 each. Coupled with multi gigabyte hard disks, copying and editing CD's is widely available.

Today, the threat of copyright violation limits CD piracy. However, due to the cost of prosecution and the difficulty of tracing and confirming the origin of copies, this threat is only practically enforceable against major producers who are caught importing large quantities of CD's, and not individuals or small-scale pirates (e.g., teenagers with computers). As the price of CD burners and writeable CD's continues to fall, music piracy may result in increasing losses in revenue to content providers, especially if the teenage culture (that buys so many CD's) embraces piracy and kids get used to seeing CD's without boxes or colorful paintings on the CD•s.

A second technological revolution is also influencing piracy. This is the ability to "compress" the amount of digital data needed to store or communicate music (or video). A one-hour music CD requires about 600 megabytes of data (16 bits/sample*44100 samples/sec*3600 sec*2 channels). This large amount of data has discouraged communication of CD's over the Internet, and storage of the CD in hard drives. However, MPEG compression technology reduces the data capacity by a factor of 8 for CD music, making it easier and cheaper to communicate and store. As a result of compression technology it is now economically feasible to communicate music with CD quality over the Internet or to transmit it directly to consumer receivers from satellites. (Similar technology allows a 100-fold compression of video signals making direct—(satellite TV and DVD recordings possible). Furthermore, businesses that sell CD's by shipping them as compressed data streams to a customer's PC with a CD writer to make a final copy will make it common for CD's not to have the elaborate paint jobs of store-sold CD's and the potential to cause a sudden rise in piracy. It also should also be noted that compression depends upon and has caused powerful digital processing engines to be placed at reception sites for compressed audio or video. These engines make possible the running of protected software (protected software is software that runs the engine but can not be analyzed by outsiders to see how it works or does the encoding or decoding) that can be used for de-encryption or be capable of performing the processing necessary to add the more complex ID tags that can be used as an aspect of this invention.

Content providers are reluctant to make full-quality music available to consumers via direct satellite broadcasting or the Internet because of the risk that exact copies of their materials, their core asset, will leave their control and freely circulate among consumers resulting in huge losses in revenue to distributors and artists. This financial threat could weaken the recording and entertainment industry in the United States.

SUMMARY

The present invention provides music distribution systems that are beneficial to all involved parties, namely consumers, content providers and data transmission providers. In certain embodiments, consumers are able to preselect music selections from thousands of CD's that are transmitted daily. Customers of the music distribution system utilize a menu driven, graphical user interface with simplified controls that provide music selection by artist, title and category (e.g., jazz, classical, rock, etc.). Music content is blanket transmitted, preferably via direct broadcast satellite (DBS), in an encoded format directly to each customer's receiving dish or antenna which is linked to the customer's user station where it is initially stored on a suitable storage medium such as a disk drive. The customer may "preview" the stored music for free and thereafter decide whether to purchase a permanent copy. If the purchase decision is made, a full quality CD is recorded via a CD writer that may be part of the user station. The customer is billed by the music distribution system operator. Antipiracy protection is provided by weaving an ID tag into the recorded music so that any illegal copies therefrom may be traced to the purchase transaction. An automated production facility may be provided to manufacture low-volume CD's (i.e., CD's that are not frequently requested) and distribute them by ground transportation, while the higher volume CD's are distributed by satellite as described above.

The music distribution system of the present invention offers numerous advantages to consumers. For example, the invention provides a much greater selection of recordings than any typical retail music store or mail order operation. The invention also provides full access to the available recordings to those who live in geographically remote and/or sparsely populated areas that may presently have little or no access to retail music stores. The invention also provides full access to recordings to elderly and handicapped persons who are housebound. In addition to a larger selection and better access, the recordings (especially high demand recordings such as "top 25" CD's and new releases) are available on demand, subject only to the time period between placing an order and the next transmission of the ordered recording.

The present invention also provides the ability to update music pricing at any time, for example on a daily, weekly or monthly basis, so that consumers can choose to order music at times when content providers offer pricing specials or incentives.

Music content providers realize increased income because a significant portion of the existing content in their music libraries is available for sale every day. The invention also allows music content providers to change pricing at any time, e.g., daily/weekly/monthly, to optimize price vs. consumer demand. In this regard, content providers are allowed to meet consumer demand for a significant portion of the existing content inventory value every day. This provides an extremely high benefit by effectively allowing the market to clear (i.e., real demand matches supply), something that the current music distribution models do not provide.

According to the invention, music content providers are confident that they can distribute their music with extremely high security by avoiding distribution of content over open networks and open operating systems and through the use of appropriate encoding technology, including encryption/decryption and the use of ID tags that permit illegal copies to be traced.

Transmission providers (DBS satellite system providers, in preferred embodiments) realize the advantage of a significantly increased income base for supporting their services and the utilization of lower cost, off-peak time for transmission of a significant portion of the music.

BRIEF DESCRIPTION OF THE DRAWINGS

Some of the features of the invention having been stated, other features will appear as the description proceeds, when taken in connection with the accompanying drawings, in which—

FIG. 2 shows the operational sequence for use of the music distribution system of FIG. 1 by a customer.

DETAILED DESCRIPTION OF ILLUSTRATIVE EMBODIMENTS

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

1. The Overall Music Distribution System, Generally

Figure 1:
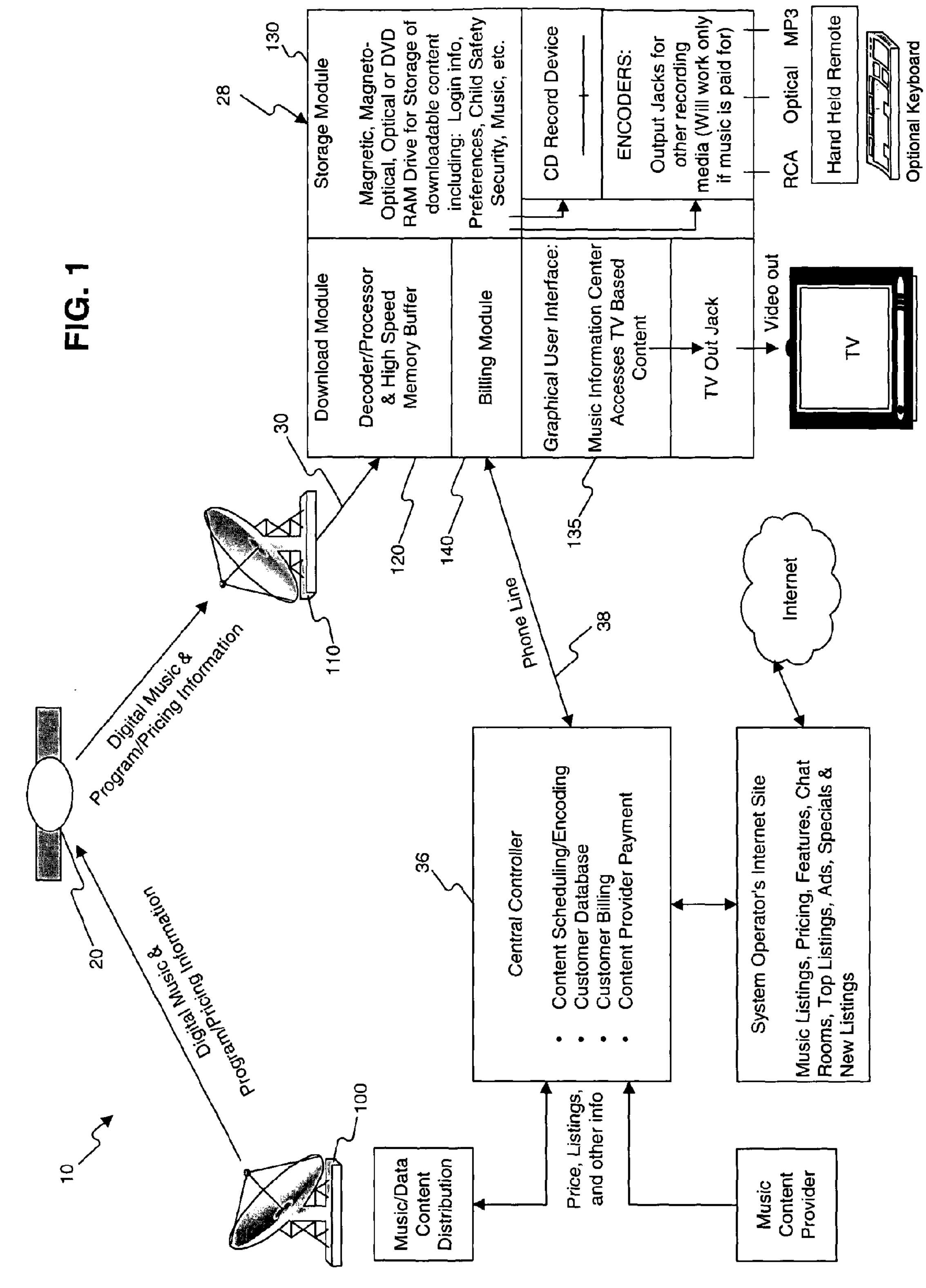
FIG. 1 is a schematic representation of a satellite-based music distribution system.

Referring to FIG. 1, there is shown a simple schematic of one embodiment of a music distribution system 10 of the invention. System 10 utilizes direct broadcast satellite (DBS) transmission via satellite 20 as the means for blanket transmitting encoded data, either in real time or in time compressed format (for example, at two to four seconds per song). The program data is received at each customer household by a receiving antenna or dish 110. Dish 110 is linked to a dedicated "box" or user station 28 by a satellite receiver link 30. User station 28 is an interactive device permitting customers to preselect desired music selections for recording through the user station. Station 28 communicates at appropriate times with a central controller system 36 via a phone/modem connection 38 (land, Internet or cellular). Central controller system 36 stores a discrete address (e.g., telephone number, credit card number or billing address) for each customer household and receives information via connection 38 to verify that a preselected music selection has been recorded. Central controller system 36 utilizes this information to bill customer households and also to credit the accounts of content providers. The satellite link (or alternatively the central controller system 36) periodically communicates with each customer household to provide information on available music and program/pricing information.

Further details of the distribution system are provided below and in commonly owned U.S. patent application Ser. Nos. 09/385,671; 09/436,281 and 09/476,078, the teachings of which are incorporated herein by reference in their entirety.

2. The Satellite(s)

According to preferred embodiments of the present invention, data transmission is achieved utilizing geostationary satellites operating in the KU band that are downlinked to conventional receiving antennae or dishes located at the customer households.

Following the recent acquisition of PrimeStar's assets by Hughes, there are now two digital broadcast satellite providers in the United States, Hughes (DSS) and EchoStar (DISH Network). EchoStar's DISH network launched an additional satellite in September 1999 (its fifth satellite) that, in combination with its previous satellites, provides continuous transmission of greater than five hundred channels to substantially the entire continental United States. EchoStar now has satellites located in the 119, 110, 61.5 and 148 positions within the Clark Belt.

With the above satellite orientations, EchoStar's new "DISH 500" system utilizes an elliptical twenty inch antenna or dish containing two LMBS heads that can receive information from two different satellites simultaneously. As mentioned above, this system permits greater than five hundred channels to be directly broadcast to each customer household.

Currently preferred embodiments of the present invention utilize the EchoStar system, most preferably the DISH 500 system, for data transmission at either real time or time-compressed transmission rates, discussed below. In alternative embodiments, the invention may be implemented utilizing the Hughes (DSS) system, or a combination of both the Hughes and EchoStar systems (resulting in a relatively smaller portion of each system's total capacity being devoted to the invention's music distribution).

3. Data Transmission Parameters

EchoStar's DISH 500 system provides a very high band width of approximately 4 megabits/sec for each channel (23 megabits/sec per transponder), for a total transmission capacity of approximately 2000 megabits/sec for five hundred channels.

It will be appreciated that instead of using more typical 120 watt DBS transponders, implementation of the present invention may be carried out with higher power transponders (e.g., 240 watt transponders) to increase the effective transponder capacity (e.g., from 23 megabits/sec to 30 megabits/sec) by reducing much of the capacity allotted for forward error correction and system management inherent in lower power transponders. Also, along with the use of higher power transponders, the invention may be carried out with quanternary (QPSK) polarization to double the effective bit transfer rate for each transponder over that which may be obtained by using current orthogonal polarization—with a sacrifice in bit error rate, that is acceptable for those applications of the invention where lower video and audio resolution is not an important consideration to the customer. Thus, the use of high power transponders (e.g., 240 watts or higher) in conjunction with higher level polarization (e.g., quanternary) permits music distribution systems of the invention to be implemented utilizing less of the DBS system's total transmission capacity, permits the transmission of a greater number of music selections or other content and permits greater time compression of the transmitted data, or a combination of the above, all to the benefit of consumers.

4. Details of the User Station and Operation

Referring again to FIG. 1, music content providers deliver music in digital form to the central controller 36 of the music distribution system. The content is encoded utilizing an encoding technology that is well known in the art, such as interlaced coding techniques in combination with a unique header code that identifies each title. In certain embodiments, only the unique header coding is employed to identify each specific title. It is also understood that the header code can also identify the exact transmission time of each title. The header code containing transmission times can be digitally communicated to the operating system of the user stations 28 to prevent unauthorized reception and subsequent duplication of digital music content. In addition, it is also understood that selection of a specific title by the user can require a completed payment before activation of initial reception and storage of the digital music content, or before the digital music content is recorded on any other device or media.

The encoded music content is scheduled and transmitted to the direct broadcast satellite up-link facility 100 by the system operator through central controller 36. In addition, periodic digital program/pricing information is transmitted to the uplink facility, for example, every ten minutes. While it is understood that direct broadcast satellite transmission currently operates in the KU Band, other frequencies can also be employed to achieve similar results. It is understood that the music content can be transmitted at real or time compressed speeds. In preferred embodiments, music content is transmitted at faster than real time speeds, where real time speeds refer to the playback speed of the recorded music. For example, a single satellite transponder capable of 23 megabits/sec transmission can transmit a typical 4 minute song in less than 4 seconds, for example, in certain applications approximately 2 seconds per song utilizing high compression techniques. Thus, EchoStar's DBS programming capacity (discussed above) allows transmission of 400,000 to 500,000 song titles (approximately 30,000 to 40,000 CD's) during a four hour period (assuming 4 seconds per song), most preferably during a period of low viewership, e.g., 1:00 AM to 5:00 AM. Using a single transponder for blanket music transmission permits transmission of 500 to 600 CD's in a four hour period.

The digital music content and program/pricing information, once received by the appropriate satellite, are then transmitted down broadly (i.e., "blanket transmitted") to geographic coverage areas where the user stations can receive the downlink transmissions.

The music program and pricing information are received by the home user's satellite dish 110 and transmitted to download module 120 contained in the user station where it is decoded and stored digitally in storage module 130 also contained in the user station.

The customer preselects music content to be downloaded by selecting the content utilizing the graphical user interface 135 shown on the TV screen. The order is communicated to central controller 36 by Internet or modem. Pricing information for the preselected music content is then transmitted to the billing module 140 contained in the user station where it is stored in nonvolatile memory such as SRAM for subsequent querying via the phone line by central controller 36.

The music content preselected by the customer is blanket transmitted by satellite 20 at the scheduled time and is received by the home user's satellite dish 110. This music content is transmitted to download module 120 where it is decoded and stored digitally in storage module 130.

In certain embodiments, the user station 28 will also contain an audio speaker system (not shown) to allow the customer to "preview" the stored music before it is recorded permanently on a CD or other recordable medium and subsequently paid for. In this embodiment, the preselected pricing information stored in billing module 140 will not be transmitted for payment to the system operator until the customer has either listened to the music content a set number of times, for example, 3 times, or the customer indicates via the graphical user interface that he wishes to permanently record it. As an alternative, previewing may be accomplished by playing a highly compressed "preview" copy through the customer's speaker system or headphones. Highly compressed material lacks richness, signal to noise ratio, stereo channels and high-frequency bandwidth. Preview can be communicated in perhaps 1% to 10% of the final copy depending upon the compression schemes used. Each preview has a brief section (20 seconds) of the real sound of the selection to allow the customer to really sample the material as well as generate interest in paying for a "good copy". If desired, the preview material may be further hobbled with some simple distortion, added noise, limited low end, crackles and pops, voice overlay, missing sections, sliding notches, amplitude compression. Content providers may be given choice as to the nature of the hobbling beyond the heavy transmission compression.

When the customer decides to purchase the music, the graphical user interface prompts the customer to insert a recordable medium such as a writeable CD into the user station, or attach other recording device to the user station's output connectors. (In certain cases, the customer may choose to record preselected music content multiple times. In such cases the music content provider may offer pricing discounts for multiple recordings.) The user station records the preselected music content stored in the user station and then either deletes the music contained in storage module 130 once the recording has been completed or allows the customer to manually delete content no longer desired.

The customer accesses (or navigates) the graphical user interface via a hand held remote. In preferred embodiments, the remote control communicates via infrared LED transmitter to an infrared sensor contained on the user station. An optional keyboard can be utilized by the customer to access (or navigate) the graphical user interface via the same infrared sensor contained on the user station.

Figure 3:
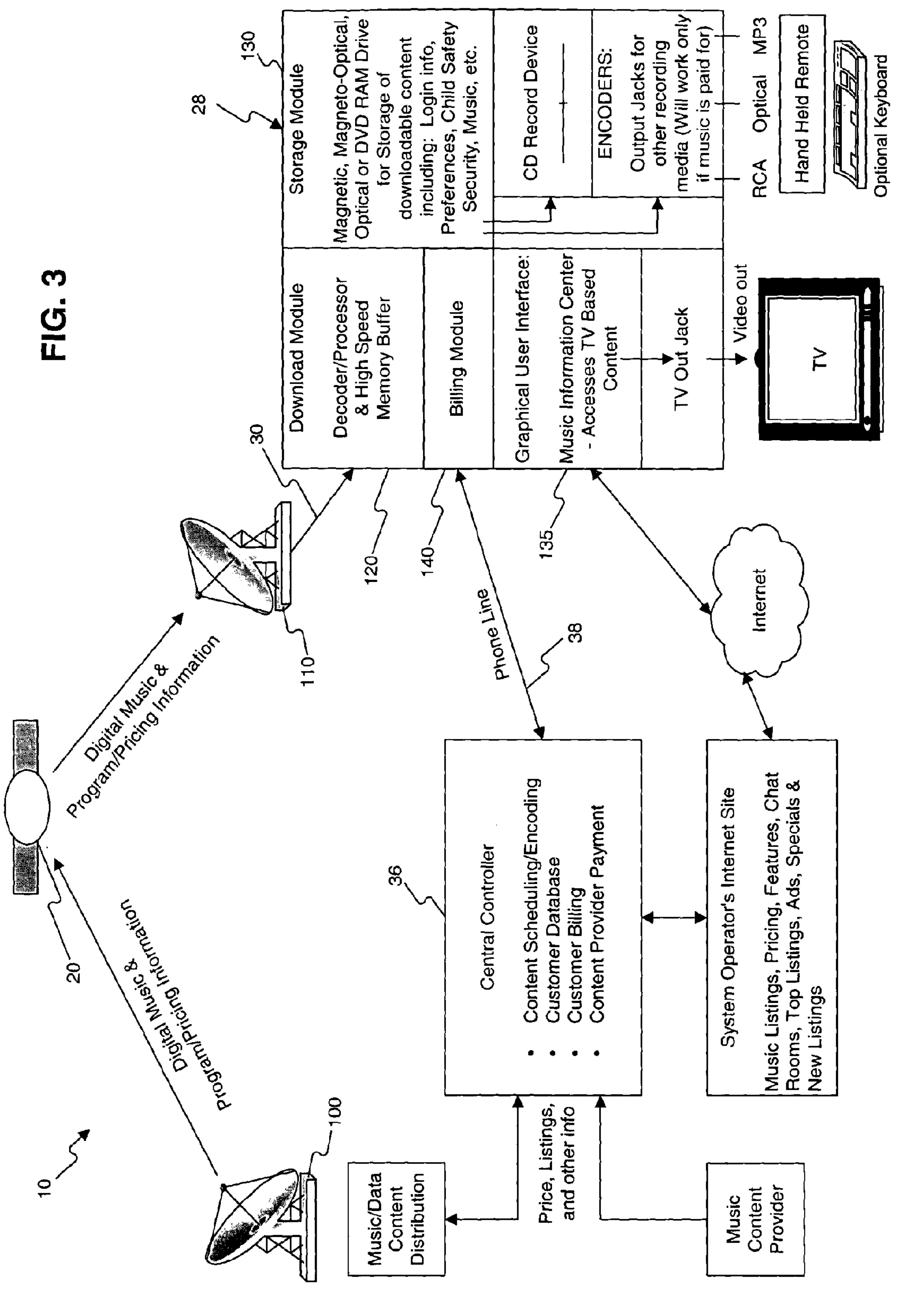
FIG. 3 shows another music distribution system wherein the user station includes an Internet browser and processor enabling customers to access the system operator's music Internet site via phone line or Internet connection.

The above sequence of operation is summarized in FIG. 2, which is largely self explanatory. The illustrated modes of operation, following account setup, are identified as:

1. Selection
2. Ordering
3. Downloading
4. Decoding
5. Previewing
6. Playing
7. CD Delivery FIG. 3 illustrates another embodiment wherein the user station contains an Internet browser and processor that enables the customer to access the system operator's music Internet site via phone line or other Internet connection.

Figure 4:
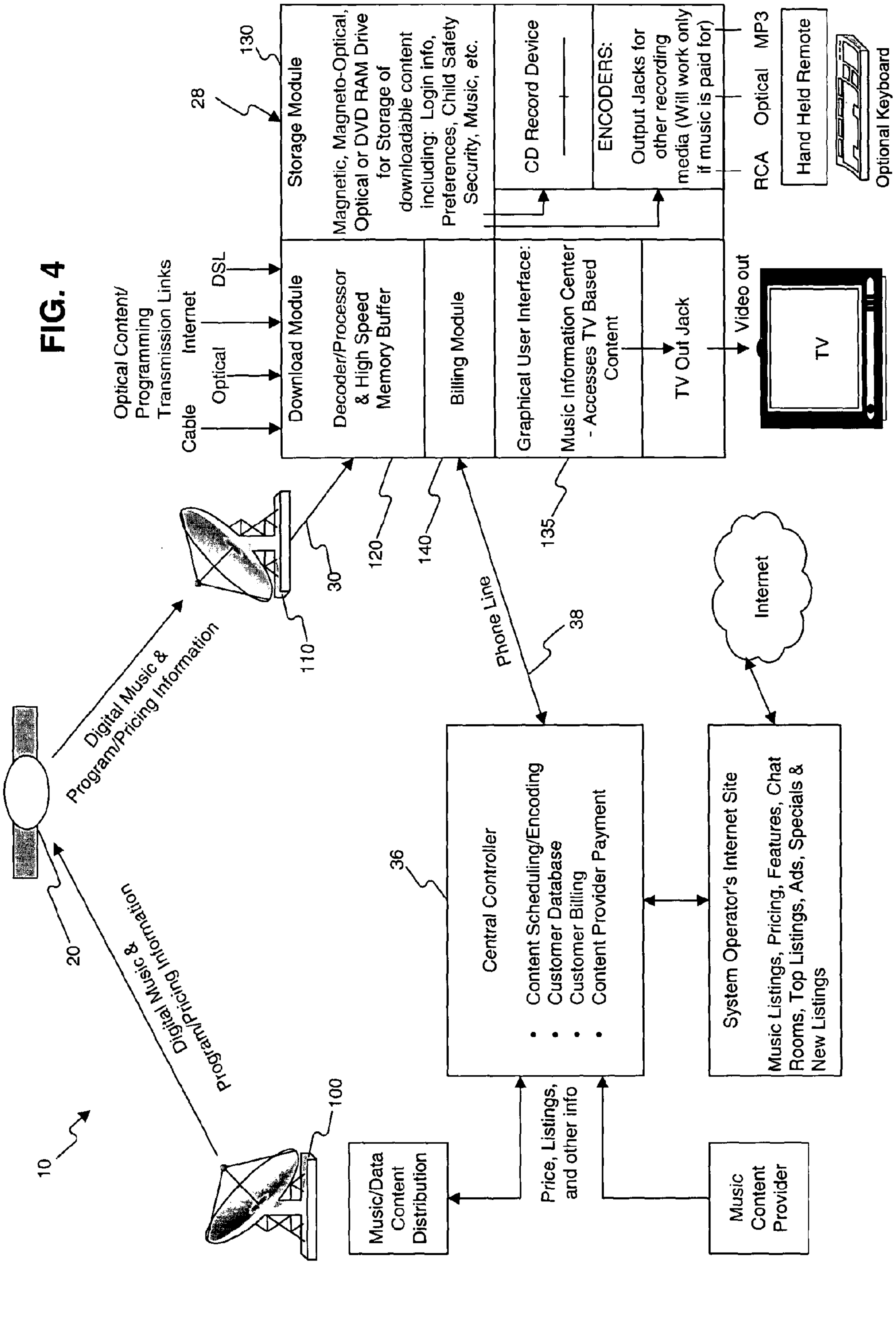
FIG. 4 shows yet another music distribution system depicting optional content/programming transmission links.

Optional digital content/programming transmission links (i.e., optional means for blanket transmitting music and other data) are shown in FIG. 4. These include, but are not limited to, cable, optical fiber, DSL and the Internet.

5. Alternative Technologies for Scheduling Transmission of Music

Figure 6:
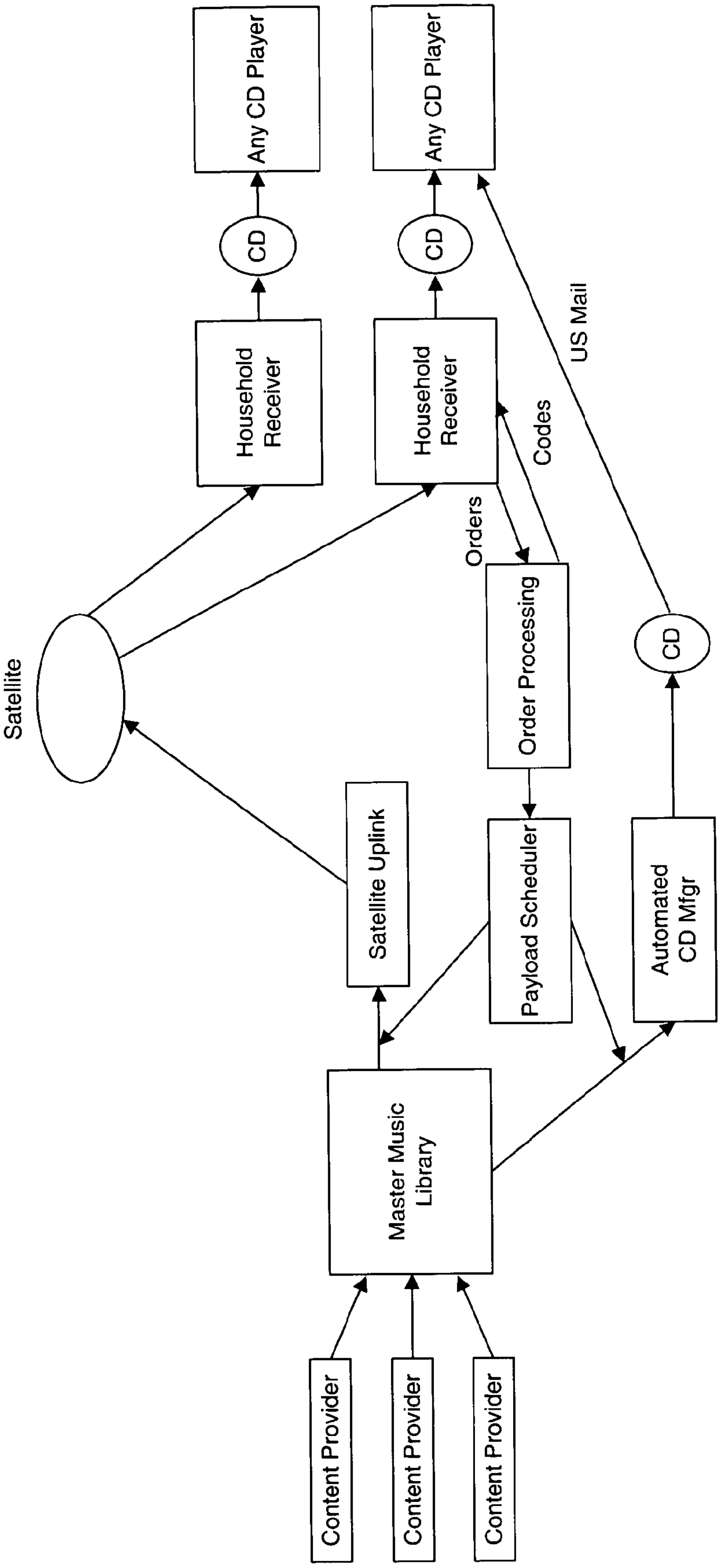
FIG. 6 is a block diagram of portions of a music distribution system showing an automated CD manufacturing operation used to supplement satellite distribution, and also showing a "payload scheduler" used to actively manage the transmission schedule of music.

Certain embodiments of the invention divide music into "tiers" of transmission frequency. For example, the music may be divided into three tiers, with Tier 1 music (the most popular) being transmitted every 30 minutes, Tier 2 music every four hours and Tier 3 music (the least requested) being sent late night. This assignment of music to appropriate tiers occurs on a daily or weekly basis. Other embodiments simply transmit all music once a day, for example during late night, off-peak hours. However, due to bandwidth limits and the significant costs of existing satellite transmission systems, it may be desirable to actively manage the transmission schedules of music to maximize consumer satisfaction (see FIG. 6).

Active scheduling of music on an hourly basis allows maximizing consumer satisfaction by monitoring music requests from all or a subset of satellite receivers and appropriately scheduling transmissions of the music. This might mean having a fixed schedule for 90% of the next few hours of transmissions, but allocating the last 10% of bandwidth (or purchasing extra bandwidth) to send music that happens to be more popular that day. More popular music might happen due to quickly changing popularity demographics perhaps due to a news story, Internet review or cultural happenstance. The effect may be to move a selection to the maximum rate of transmission (e.g., every 15 minutes) or move a Tier 3 selection from an overnight transmission to an hourly transmission. Similarly, a Tier 1 selection that is poorly requested might be replaced.

There are many possible schemes for assigning transmission slots varying from the "hottest 10%" scheme above to methods that assign slots based upon the estimated ordering demographics. For instance, if college students are determined to place a high value on quick delivery of their selection whereas the "older adult" market is as satisfied with one-hour or two-hour delivery, then requests coming from the college market may get priority assignment of transmissions. The demographics of the current ordering population might be estimated from the type of music being ordered or recognizing the request source, like a request from a "college town" is likely a college request.

The mechanisms to handle active scheduling rely on knowing what selections are currently being requested. Current satellite receivers operated by EchoStar and Hughes communicate by modem with central computers on varying schedules. In some systems, modem connections are infrequent and credit is extended to the customer so that a receiver can order six or eight movies before requiring connection to the billing computers. In other systems, individual receivers might be contacted ("pinged") by the billing computers on a daily basis to check for usage. Active scheduling of music transmission times requires that all or part of the satellite receivers contact the central computer whenever an order is placed. This communication would occur over phone modem, cable modem or Internet and may be initiated without the customer's knowledge. Copies of order records in the central computer must be transferred to a computing system that schedules transmissions, and then schedules must be communicated to the system that feeds music (or video) to the satellite uplink transmitters. If desirable, transmission schedule information can be updated on the consumer interface as soon as schedules are revised, perhaps allowing a consumer to imagine that their order has prompted the system to send a selection more frequently. Schedules are only a fraction of a megabyte in size and may be sent very frequently without significantly impacting bandwidth.

6. Ensuring Flawless CD's Using Checksums and Multiple Downloads

Satellite receivers do not have perfect reception due to the tradeoff between electrical power and bandwidth of the satellite. Weather conditions, motion of atmosphere layers or obstructions between the dish and the satellite may interrupt the signal. A momentary loss of bits will cause a TV image to freeze for a frame or two, while longer interruptions will cause reception to blank. Whereas a short loss in video is a couple of frozen frames, data loss in audio may leave a glaring blank in the music. Therefore, a satellite system for transmission of audio or software (or video) CD's requires a method to detect and fix data losses at the receiver.

Patching data "potholes" requires a method for sensing potholes and another for placing asphalt to fill them. Typically, digital data is sent in packets of bits (perhaps one thousand bits at a time with each packet containing 1/40 second of music). Loss of bits within a packet can be detected by error codes or merely a "checksum" at the end of the packet which indicates the sum of all the sent bits. Each packet may have an identifying number so that loss of an entire packet is noticed. This is all conventional Internet technology.

Repairing data loss might be accomplished by replacing an occasional packet by the receiver asking for a copy of the packet via an Internet or modem phone connection. However, the frequency of data loss and amount of contiguous data might be lost (for instance, during a rainstorm), requires a wider bandwidth, like the satellite, to provide the material to repair data loss.

Therefore, in certain embodiments, the present invention provides the capability in the system to detect bit losses and receive a second copy of the selection and use all or part of that copy to patch the missing or corrupted bits or packets in the original download. This would require storing a requested download on the storage medium (e.g., hard drive), checking for missing data, informing the customer that the download was imperfect (allowing the customer to burn a CD, listen to a preview or wait for a second transmission), then receiving and storing all or part of a second (or rarely a third) transmission, and then selecting good packets of bits to make up the final copy.

In practice, a customer selects a CD via the TV-remote interface and the TV screen notes a download, say, 45 minutes later. As soon as the download is completed, the customer is informed of the quality of the download (A, B, C, D) and informed of the time of the next transmission of the material. The customer is then allowed to preview the corrupted version, or even burn a CD if they wished.

7. Distributing Low Request CD's Via an Automated CD Production Facility

In conjunction with blanket transmission of more popular music, a central facility (FIG. 6) may be provided to manufacture low-volume CD's (i.e., CD's that are not frequently requested) and distribute them by ground transportation. A system of the invention that includes such a production facility carries low-volume products from record company master music libraries to meet the needs of those companies to sell all of their archives. Typical satellite costs may require at least 5 to 10 purchases per satellite transmission to pay for the transmission costs. Backing satellite transmission with shipped CD's also provides CD's for locations where poor satellite reception makes it difficult to get a clean CD download, or to people who do not have a dish. Preferably, the automated burner facility: takes orders from receivers with modems or via an Internet site;

has electronic access to the music libraries of the satellite system via Internet or local storage; has totally automated CD burners, CD painters, jacket printers, packaging, labeling, shipping and billing, -encodes ID tags/watermarks in all manufactured CD's to deter illegal copying; and is located at a single central or multiple regional locations.

Because each CD is manufactured upon request from blank writeable CD's, totally automated production and distribution is possible resulting in low production and distribution costs compared to a typical CD store. The facility may also manufacture music recordings on other media such as DVD's, MD's and other digital media. Additionally, the facility could manufacture videos and software.

8. Piracy Protection

The threat of piracy can be controlled through a music distribution system that uniquely labels every legal CD copy of music (or video) with an "ID tag". Thus, if a customer sells copies of a CD that he purchased, that copy and any copies of it can be traced to his original purchase. Such identification serves as the basis of a legal deterrent for large or small-scale piracy. Furthermore, the ID tag may be contained in each song of a CD protecting each complete piece of artistic material. The ID tag may be as simple as an inaudible millisecond blip at the start of each selection or may be "woven" into the music so that it survives re-recording and compression schemes by being integral to the music, but not noticeable to the listener or easily discovered and removed by potential pirates. Multiple hidden tags may be used to discourage attempts to remove the code by comparing multiple legal copies of the music. Similarly, multiple tags also provide the advantage of identifying illegal copies in those cases where a pirate successfully removes some, but not all, of the tags. At worst, a pirate may successfully remove part of the tags making it possible to determine that the music copy is illegal, but without identifying the original purchaser.

Distributing music that contains unique ID tags limits piracy by making it possible to prove that a CD is an illegal copy and makes the legal source of the copy identifiable. This technology makes it financially feasible to distribute full-quality CD music (or video) to consumers via direct satellite connections in the manner described above in connection with FIGS. 1-4. Furthermore, by placing tags in each song, it makes it possible to have a protected system of allowing consumers to create unique assortments of songs on a CD, and for artists and distributors (content providers) to receive revenues for each song used. Thus, each home can become a "CD or music factory" where a person can create their own collection of songs by artists, through a system in which the original artist and distributor are properly paid for their materials. Furthermore, the decline in piracy resulting from the threat of legal prosecution could result in more legal copies of music being purchased so that providers can charge less per legal copy so that this art is more widely available.

Two major venues contemplated for distribution of protected CD's are the Internet and satellite. In the Internet case, a customer contacts an Internet site where they purchase the CD. The site places ID Tags in the music or video selected, then compresses the selection and sends it to the purchaser. The purchaser then de-compresses (inflates) the selection and stores it on his hard drive or writes it to a blank CD for later playing. In the case of satellite distribution, a customer contracts over a phone or Internet connection to purchase a particular CD. At scheduled times, perhaps once a day, the satellite company compresses this CD, encrypts it and then blanket broadcasts it. The customer's receiver (e.g., user station 28, above) stores the transmission and then de-encrypts it using a system and key supplied by the satellite company, and then that same system encodes an ID tag in the music (or soundtrack) using a tag number downloaded from the satellite company during the purchasing transaction. Both the Internet delivery system and the satellite delivery system create a customer CD that may be played on any conventional CD player. Both the Internet and satellite distribution systems archive the ID tag information with the customer's identity and perhaps other aspects of the transaction. This data may be sent back to the original content provider or to another company specializing in detecting and prosecuting pirates.

The above scheme may also be applied to CD's sold in stores. In this case, each CD has a unique ID tag encoded before it is distributed to the store. The CD case has a bar code associated with the ID Tag. At the time of purchase the bar code is associated with a customer's charge card or identity. This information is then sent back to the CD manufacturer.

It will be appreciated that it is possible to encode an ID tag into a music selection so that it will not be heard during normal playback, but could remain and be detectable in a recording made from a selection played over the radio.

The description will now turn to a detailed discussion of representative ID tags. As stated above, an ID tag uniquely identifies each copy of music or video. In its most simple form, a 10 digit (37 bit) tag may be stored in three 16-bit samples (1/12,000 of a second long) on a CD. A three-byte tag number equivalent to full volume is a barely perceptible pop to young, sensitive ears and is completely inaudible to the majority of the population. In a more complex form, the tag may be woven into the frequency or time spectrum of the music, where it is both inaudible and survives compression and transmission, or even serious attempts by hackers to remove the tag. While the simple tag may be appropriate for certain applications, more complex tags may be desired for other applications, especially for high-profit, piracy-prone contemporary music (or video).

A simple tag, as discussed immediately above, may consist of three 16-bit numbers placed at the start and/or end instant of a CD or each of its songs. To limit audibility, the 37 bits may be carried by the 64 bits of the first four samples at the beginning of the CD and encoded to have low amplitude or alternating polarity to further hide its audible presence from consumers. Such a tag may be easily read by a computer and is not difficult to eliminate when making copies. However, the technical nature of tag removal coupled with the legal implications of distributing software capable of destroying the tag serves as a significant deterrent to general piracy.

The complex ID tag is inaudible by humans, yet is sufficiently integral to the music (or video) that it remains during simple filtering or compression operations. The ID tag may be a multidigit number (or collection of bits) that can be read or recovered from the CD by those who originally placed the tag. Examples of tags are low bit-rate encoding in low amplitude, increase or reduction of high frequency music content, short-duration ratios of harmonic components, background sounds, slight shortening or lengthening of sustained sounds, or even localization cues or echoes for a sound object. Key to "hiding" the sounds is to encode the bits as short duration shifts in the sounds, shifts that are preserved during compression but that are not detectable by normal human hearing or attention. In other words, it is desirable to take advantage of the parts of the music that have "excess information" coded during sound compression that is not noticed by humans.

To make the complex tag hidden and recoverable additional information may be used in reading the tag that is not contained in the CD. This information describes where the real (or perhaps false) ID tags are to be placed, and what the nature of the bit encoding is at that location. The simplest form of location would be milliseconds from the start or end of the song for each bit. Similarly, time from a particular feature in a song, like milliseconds after the attack greater than 20 dB about 23 seconds into the song, could be used to identify the location of one bit of an ID tag. Obviously many bits are also encoded that obscure the actual tag bits. Real and actual bits may be different or interchanged among different legal copies of a song.

It should be expected that as music (or video) compression techniques evolve, methods for placing and retrieving ID tags will also evolve.

In its simplest form, the ID tag is a unique identifying number, ID number, that is placed at the start, end or between selections on a copy, of the CD when it is produced for the consumer. As stated above, a unique ID number might be placed on each CD as it is manufactured and later associated with a customer name or credit card during a store purchase. Or, in one preferred manner of carrying out the inventions, the ID number might be inserted during the process of writing a CD with music that is downloaded from a satellite or the Internet. In this case, the software accomplishing the transaction to purchase the music also sees that the ID number is obtained from the seller and places this ID number at appropriate places in the CD during the recording process.

Looking at a more complex form of the ID tag, when a legal CD is distributed over the Internet, via direct satellite transmission or even CD's that are manufactured for sale in CD stores, preferably two blocks of information are involved. The first block, called the "location data", is an encrypted description of all the locations in the music to contain the entire or part of the ID tag, and the encoding techniques used for each location in which false or real bits of the ID tag will be placed. The location data is used in creating or reading the ID number but is not stored on the CD. The second block of information, called the ID number, is a unique number identifying the legal transaction. The ID number may be a customer identification number, like a credit card or phone number, or customer purchasing account number, or may be a seller generated transaction number. There are many different schemes for filling redundant ID tags encoded on a CD so that tampering or removal of any tag or part of a tag is noticed.

Some types of tags may be placed in the time domain and others in the frequency domain. Time domain tags may involve changing an aspect of a time-domain feature like the decay time for a note, whereas frequency domain features such as amplitude of an overtone would be better inserted in a frequency domain transform like the fast Fourier transform used to do MPEG compression. The amount of computer speed needed to insert frequency domain tags has only been recently available in consumer computers.

Location data is communicated to a "home music factory" (e.g., user station 28) as encrypted information sent with the compressed music. If an ID number were 10 digits (about 33 bits) long then perhaps just 33 or several hundred locations would be contained in the location data. Software may accomplish this task at the site of music distribution, picking regions of the sound that are suitable for hiding bits within, or trial bits may be encoded by software with trained observers, perhaps the person who mixed or originated the music confirming that the music was not degraded by the inclusion of the bits.

ID numbers would be contained in the music factory as a standard ID number or as a number securely given to the purchaser during the purchase transaction. One number might be given for a whole CD or individual numbers for each song on the CD might be given.

The customer's security information should not only contain the location data and ID tag but instructions for creating each type of encoding of a bit in the fabric of the music. Types and encoding of bits may be kept secret so that the search and removal of encoded ID's will be more difficult. It is also likely that types of encoded cues will evolve over time.

Note that a unique ID tag can be encoded in the manufacture of a CD for sales in a store as well as a bar coded copy on the CD box allowing association of a purchaser's identity (or credit card number) with that legal copy. Similarly CD's delivered in compressed form over the Internet can have the complex tags woven into the audio at the delivery end. Complex tags can be designed that are not affected by the compression-decompression process.

A simple ID tag consisting of three two-byte samples could easily, but illegally, be eliminated during a piracy operation with the proper software. However the more complex encoding schemes are very difficult to find in order to eliminate or change it.

To be immune from destruction the encoded bits need not affect a person's perception of the music. This is not difficult since the information content of even compressed music is orders of magnitude beyond the capacity of humans to take in information.

However, since humans attend to different aspects of music at different times, encoding must be carefully done.

Hints of types of acceptable encoding come from knowledge of what aspects of sound are most carefully attended by humans. For example, quick rise-times or strong attacks are carefully processed for localization cues, and frequency or pitch can be sensed with great accuracy by some persons. The literature on the development of music compression algorithms contains discussions of what aspects of music must be carefully preserved and what is less noticed but nevertheless kept due to the need to preserve other, similar, features in the encoding.

It will be appreciated that it is possible to place both a simple and a complex ID number on a CD as a method to determine the purchaser of a CD that was subsequently altered and copied.

A final matter with respect to antipiracy protection is that the "hidden" ID tag data in the music should survive compression. By way of background, music (or audio) is typically made digital by sampling the music 44,000 times a second with a resolution of 16 to 20 bits. The number of samples is necessary to record the highest frequencies, the resolution allows 90 to 120 db of dynamic range above noise. All compression techniques reduce the information necessary to digitally communicate the music. The primary basis of commercial compression techniques is to reduce resolution in frequency bands that will be least noticed by the human ear. This is true for ISO/MPEG, Sony ATRAC and Phillips PASC. To achieve the five or ten fold compression, all these techniques work with 500 to 1000 point blocks of samples (10 to 20 milliseconds), establish a realistic resolution for each of 30 to 50 frequency bands based upon the threshold of human hearing and masking by sounds of similar pitch, and then represent the various spectral components of the sound with as few bits as possible. For example, ATRAC averages 2.8 bits per sample to get the equivalent of 20 bits pre sample of resolution. Some compression techniques also make use of redundancy between stereo channels. Thus, all common compression techniques focus a minimum number of bits to represent each 10 to 20 milliseconds of sound, and trying to place an ID tag or "watermark" in this texture will likely affect the sound. Compression methods work with small chunks of sound because computation required for spectral filtering techniques (like the FFT) increases drastically as samples lengthen, and because this sort of compression represents the "low hanging fruit" in reducing the data needed to convey sounds. With compression focused on the information in short blocks of sound it is a good strategy to look for ID tag/watermarking methods that are inaudible features that extend across blocks and are therefore to be unaffected by compression. Current audio watermarking techniques convey information by putting notches in high frequency sounds, low amplitude sounds spectrally adjacent to louder tones, influencing least significant bits of encoding and short echoes. Known watermarking techniques place marks within the single blocks of sound to be compressed. Several aspects of the ID tag/watermarking aspect of the present invention differ from conventional watermarking:

it is necessary to convey only a couple of dozen bits in a song;

b. an entire song may be held and processed at once in memory (e.g., hard disk) with substantial processing power being available to do the watermarking; and c. the location and nature of the watermarking sites can be kept confidential.

According to the invention, ID tags/watermarks may be based upon undetectable changes, located by features in the referenced to the rough length of the piece. These features may be subtle shifts in the texture of the music, like relative amplitude between channels of a narrow range of frequencies, or duration of time between features. While the ear is very sensitive to time interaurally or as a component of the onset of a sound, time is looser with respect to time between features in the music, yet time is precisely preserved by compression techniques. It is theoretically possible to time the duration between two attacks to 20 microseconds. In practical terms, noticing a 50% rise in a 500 Hz attack may be timed to less than 200 microseconds. In contrast the time scale that humans perceive the timing of sequential events is in the range of 10 milliseconds (10000 microseconds), opening a 50:1 window for encoding and perceiving slight timing shifts that carry an ID tag. Attacks may be used because they are both easy to detect and have sharp temporal features allowing accurate determination of time to make interval measurement more precise. In practice, ten digits may be encoded between 10 to 30 attacks by slightly lengthening the duration of sound between attacks without any alterations in pitch. To accomplish this task, software must recognize the existence of attacks and simple decays that can be extended. In some sorts of music, like single instrument works, this is simple. Other types of music typically require more work to achieve without any perceptible alteration in the music. In this regard, vocoder technologies that can stretch time without altering pitch provide existing techniques for accomplishing this. After a pair of attacks had been located in the music, these locations are measured as a fraction of the duration of the entire selection. The length of the delay encodes one or several bits of the ID tag. Then an appropriate length of the music between the two attacks is lengthened the desired amount, say 500 microseconds. The lengthening preferably is applied to all channels of the music. To read an ID tag, the original pairs of attacks are approximately located as a fraction of the duration of the whole selection. Then the attacks are exactly located by moving forward several milliseconds in the altered music until they are recognized and their positions pinpointed. The duration between is measured and compared to the original amount. Added or removed time codes individual bits or digits. Subsequent pairs may be located relative to earlier skewed pairs.

It will be appreciated that security of the music may be enhanced by periodically changing the encryption keys. For example, when using satellite as the blanket transmission means, 1024 bit RSA encryption keys may be used and changed periodically, with the changes being downloaded to the satellite receivers of the customers.

9. Business Models

Figure 5:
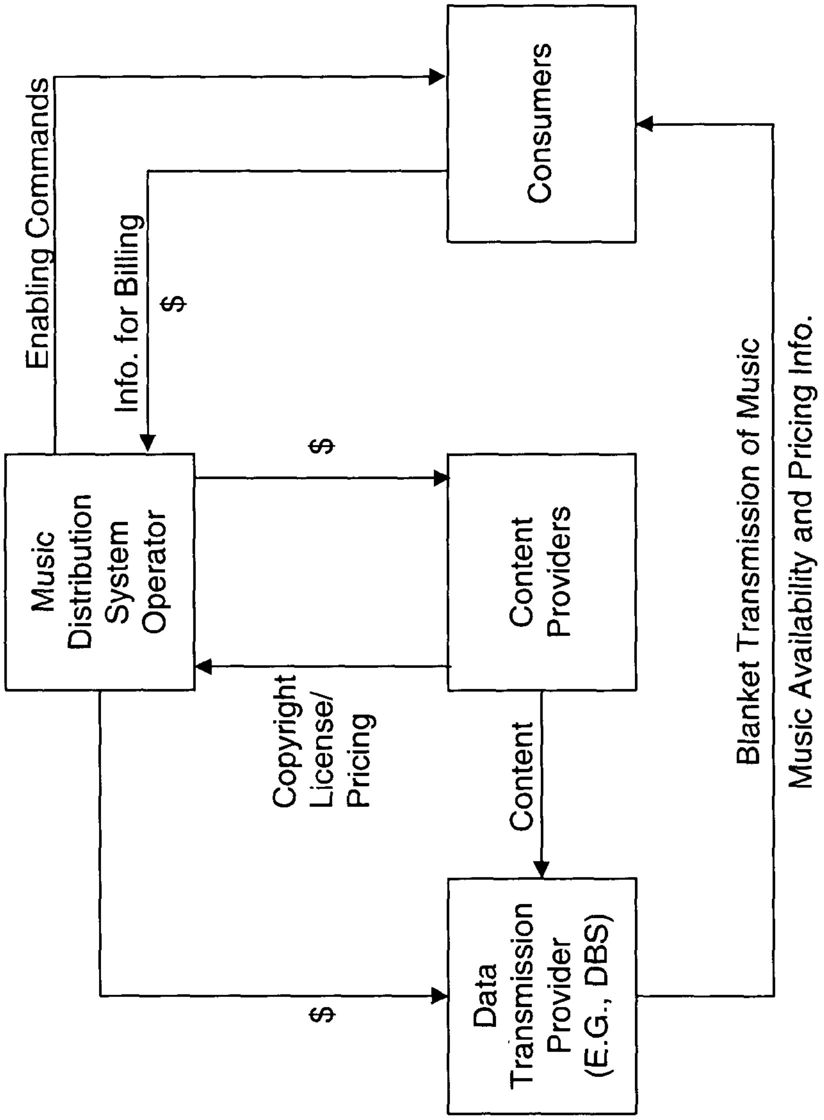
FIG. 5 is a block diagram of one simplified embodiment of a business model for commercializing a music distribution system.

The present invention provides significant flexibility with respect to the business model to be used to commercialize the invention. In one simplified embodiment, shown in block diagram, form in FIG. 5, the music distribution system operator interfaces with three parties, the data transmission provider, the content providers, and consumers. The content providers provide content to the data transmission provider which, in turn, blanket transmits the content to the consumers, preferably by direct broadcast satellite. The satellite transmission also includes content availability/scheduling data and content pricing data, updated periodically. The content providers also provide copyright license and pricing requirements to the music distribution system operator. Both the data transmission provider and the content providers receive payments directly from the music distribution system operator. Lastly, the music distribution system operator periodically receives information for billing, while also sending enabling commands to the consumers.

While the present invention has been described in connection with certain illustrated embodiments, it will be appreciated that modifications may be made without departing from the true spirit and scope of the invention.

What is claimed:

1. A user station for use in a music distribution system for distributing music to consumer locations at which user stations may be situated, wherein the music distribution system includes a data transmission system configured to blanket transmit a plurality of music content items to remote consumer locations in digital form, said user station comprising:

a storage medium configured to store music content items;

a pre-selection mechanism configured to enable a consumer to pre-select from the blanket transmission a plurality of music content items for storage in the storage medium of the user station, wherein the user station is at a location which is remote from the music distribution system;

a selection mechanism configured to enable said consumer to select for making a permanent copy any one of the pre-selected music content items stored in the storage medium;

a mechanism configured to receive pricing information for the music content items stored in the storage medium and to store said pricing information in the user station; and a mechanism configured to transmit pricing information for a music content item stored in the storage medium to the music distribution system in response to the user station receiving a consumer request to make a permanent copy of the music content item stored in the storage medium.

2. A user station as recited in claim 1, further comprising an access mechanism configured to enable the user station to access a content library comprising said pre-selected music content items.

3. A user station as recited in claim 1, further comprising:

a play list mechanism configured to enable a consumer to construct a play list; and a playing mechanism configured to play said play list in any sequence at any time.

4. A user station as recited in claim 3, wherein said play list mechanism comprises an ordering mechanism configured to order said sequence including continuous playback, shuffle, sort-by-artist, sort-by-title or sort-by-category.

5. A user station as recited in claim 1, wherein the storage medium is a portion of a high capacity storage medium dedicated to recording pre-selected music selections.

6. A user station as recited in claim 5, wherein said high capacity storage medium is a hard drive.

7. A user station as recited in claim 1, wherein said pre-selection mechanism comprises a menu driven, graphical user interface with simplified controls providing music selection by artist, title and category.

8. A user station as recited claim 1, wherein said pre-selection mechanism comprises a consumer preference selection mechanism configured to enable selection of consumer preferred music styles by a consumer at said remote consumer location.

9. A user station as recited in claim 8, wherein said consumer preference selection mechanism comprises a graphical user interface with a music style preferences list.

10. A user station as recited in claim 8, wherein said consumer preference selection mechanism comprises a graphical user interface with music style, subgroup and artist preferences lists for selection by said consumer.

11. A user station as recited claim 1, wherein the storage medium connected to a permanent storage medium.

12. A user station as recited in claim 1, wherein the central controller system comprises a general population cluster preference database; a consumer catalog generator module; an individual consumer preference information storage module; and a payload scheduler; wherein said individual consumer preference information storage module comprises an information collection mechanism configured to obtain said consumer preferred music styles of each consumer; and wherein said user station further comprises a mechanism configured to provide information concerning said consumer preferred music styles to the central controller system.

13. A user station as recited in claim 12, further comprising a mechanism configured to read ID headers on the pre-selected music content items and to select for recording only those that are indicated by said individual consumer catalog as being desirable to the consumer.

14. A user station as recited in claim 1, further comprising a download module configured to decode pricing information and said transmitted music content items.

15. A user station as recited in claim 1, further comprising: an access mechanism configured to enable the user station to access a content library comprising said pre-selected music content items; a play list mechanism configured to enable a consumer to construct a play list; and a playing mechanism configured to play said play list in any sequence at any time.

16. A user station as recited in claim 15, wherein said play list mechanism comprises an ordering mechanism configured to order said sequence including continuous playback, shuffle, sort-by-artist, sort-by-title or sort-by-category; wherein said user station comprises a portion of a high capacity storage medium dedicated to recording pre-selected music selections; wherein said pre-selection mechanism comprises a menu driven, graphical user interface with controls providing music selection by artist, title and category, and a consumer preference selection mechanism configured to enable selection of consumer preferred music styles by a consumer at said remote consumer location; wherein said consumer preference selection mechanism comprises a graphical user interface with a music style preferences list; wherein said consumer preference selection mechanism comprises a graphical user interface with music style, subgroup and artist preferences lists for selection by said consumer.

17. A user station as recited in claim 16, further comprising: a high capacity storage medium connected to a permanent storage medium; a mechanism configured to read ID headers on the pre-selected music content items and to select for recording only those that are indicated by said individual consumer catalog as being desirable to the consumer; and a download module configured to decode pricing information and said transmitted music content items.

18. A method for use at consumer locations of a music distribution system, comprising:

receiving, at a user station employed at a remote consumer location, a blanket transmission of a plurality of music content items;

receiving, at said consumer location, information identifying available music content items;

recording, in a storage medium of said user station, a pre-selected music selection;

transmitting a signal from said user station to verify to a controller system that the pre-selected music selection has been recorded at said consumer location, wherein said user station is at a location which is remote from said controller system;

receiving, at said consumer location, pricing information for the music content item stored in the storage medium and storing said pricing information in the user station;

transmitting said pricing information for the music content item stored in the storage medium to a billing system in response to receiving, at the user station, a consumer request to make a permanent copy of the music content item stored in the storage medium, wherein the billing system is configured to bill the consumer for making the permanent copy in accordance with the pricing information transmitted to the billing system; and receiving, at the consumer location, billing information relating to the copied music content item.

19. The method of claim 18, further comprising employing a pre-selection mechanism at the consumer location to preselect and record desired music selections included in the blanket transmission of a plurality of music content items.

20. The method of claim 19, wherein the pre-selection mechanism comprises a content library, said content library comprising said pre-selected music selections.

21. The method of claim 19, further comprising employing a playback mechanism to playback recorded music selections according to a consumer created play list, said play list being arranged to play said recorded music selections in any sequence at any time.

22. The method of claim 21, wherein the playback mechanism includes a menu driven, graphical user interface with simplified controls for user selection of said music.

23. The method of claim 19, wherein said blanket transmission is direct broadcast satellite data transmission accomplished with a high power transponder, thereby increasing effective transponder capacity.

24. The method of claim 19, further comprising selecting consumer preferred music styles by using a graphical user interface having a musical style preferences list.

25. The method of claim 24, further comprising selecting consumer preferences of music subgroup and artist by using said graphical user interface having a subgroup preferences list and an artist preferences list.

* * * * *